(12) United States Patent
Kim et al.

(10) Patent No.: US 6,462,798 B1
(45) Date of Patent: Oct. 8, 2002

(54) MULTI-DOMAIN LIQUID CRYSTAL DISPLAY DEVICE

(75) Inventors: Kyeong Jin Kim, Bucheon-shi; Yun Bok Lee, Anyang-shi; Jang Jin Yoo, Seoul, all of (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/327,283

(22) Filed: Jun. 4, 1999

(30) Foreign Application Priority Data

Mar. 9, 1999 (KR) ............................................. 99-07633

(51) Int. Cl.[7] ...................... G02F 1/1337; G02F 1/1343
(52) U.S. Cl. ........................................ 349/129; 349/143
(58) Field of Search ................................. 349/129, 146, 349/143, 139, 39

(56) References Cited

U.S. PATENT DOCUMENTS

| | | | |
|---|---|---|---|
| 4,581,608 A | 4/1986 | Aftergut et al. | 340/704 |
| 4,728,175 A | 3/1988 | Baron | 350/336 |
| 4,937,566 A | 6/1990 | Clerc | 340/784 |
| 4,978,203 A | 12/1990 | Yamazaki et al. | 350/339 R |
| 5,249,070 A | 9/1993 | Takano | 359/54 |
| 5,517,342 A * | 5/1996 | Kim et al. | 359/59 |
| 5,574,582 A | 11/1996 | Takeda et al. | 359/59 |
| 5,608,556 A * | 3/1997 | Koma | 349/143 |

(List continued on next page.)

FOREIGN PATENT DOCUMENTS

| | | |
|---|---|---|
| EP | 0 752 611 | 1/1997 |
| EP | 0 814 142 | 12/1997 |
| EP | 0 854 377 | 7/1998 |
| EP | 0 884 626 | 12/1998 |
| GB | 2 296 810 | 7/1996 |
| GB | 2 321 718 | 8/1998 |
| GB | 2 337 843 | 12/1999 |
| JP | 05-297412 | 11/1993 |
| JP | 06-258649 | 9/1994 |
| JP | 06258649 B2 | 9/1994 |
| JP | 08220511 A1 | 8/1996 |
| JP | 09-197420 | 7/1997 |
| JP | 09-230387 | 9/1997 |
| JP | 10333170 A1 | 12/1998 |
| JP | 11052381 A1 | 2/1999 |
| KR | 2000-047368 | 7/2000 |
| WO | 961 0774 | 4/1996 |

OTHER PUBLICATIONS

A. Lien, R.A. John, Two–Domain TN–LCDs Fabricated by Parallel Fringe Field Method, SID Digest, 1993, pp. 269–272.

(List continued on next page.)

Primary Examiner—Toan Ton
Assistant Examiner—Andrew Schechter
(74) Attorney, Agent, or Firm—McKenna Long & Aldridge LLP

(57) ABSTRACT

A multi-domain liquid crystal display device includes first and second substrates facing each other and a liquid crystal layer between the first and second substrates. A plurality of gate bus lines are arranged in a first direction on the first substrate and a plurality of data bus lines are arranged in a second direction on the first substrate to define a pixel region. A common-auxiliary electrode is surrounding the pixel region on a same layer whereon the gate bus line is formed. A gate insulator is formed over the whole first substrate and a passivation layer is formed on the gate insulator over the whole first substrate. A pixel electrode is formed in the pixel region, the pixel electrode having an electric field inducing window in the inner part thereof. A light shielding layer is formed on the second substrate, a color filter layer is formed on the light shielding layer, a common electrode is formed on the color filter layer. An alignment layer is formed on at least one substrate between the first and second substrates.

41 Claims, 43 Drawing Sheets

U.S. PATENT DOCUMENTS

| | | | | |
|---|---|---|---|---|
| 5,623,354 A | | 4/1997 | Lien et al. | 349/124 |
| 5,666,179 A | * | 9/1997 | Koma | 349/143 |
| 5,668,650 A | | 9/1997 | Mori et al. | 349/42 |
| 5,673,092 A | * | 9/1997 | Horie et al. | 349/86 |
| 5,694,185 A | * | 12/1997 | Oh | 349/46 |
| 5,737,051 A | | 4/1998 | Kondo et al. | 349/141 |
| 5,748,179 A | * | 5/1998 | Ito et al. | 349/152 |
| 5,777,701 A | | 7/1998 | Zhang | 349/44 |
| 5,796,456 A | * | 8/1998 | Takatori | 349/117 |
| 5,889,569 A | * | 3/1999 | Okamoto et al. | 349/110 |
| 6,091,466 A | * | 7/2000 | Kim et al. | 349/43 |
| 6,215,542 B1 | * | 4/2001 | Lee et al. | 349/143 |
| 6,285,431 B2 | * | 9/2001 | Lyu et al. | 349/143 |
| 6,300,996 B1 | * | 10/2001 | Matsuyama et al. | 349/144 |
| 2001/0001567 A1 | | 5/2001 | Lyu et al. | |

OTHER PUBLICATIONS

A. Lien, R.A. John, TFT–Addressed Two–Domain TN VGA Displays Fabricated Using the Parallel Fringe Field Method, SID Digest, 1994, pp. 594–597.

N. Koma, Y. Baba, K. Matsuoka, No–Rub Multi–Domain TFT–LCD Using Surrounding–Electrode Method, SID Digest, 1995, pp. 869–872.

H. Murai, M. Suzuki, S. Kaneko, Novel High Contrast Random and Controlled 4–Domain CTN–LCDs with Wide Viewing Angle, Euro Display '96, pp. 159–161.

Y. Koike, S. Kataoka, T. Sasaki, H. Chida, H. Tsuda, A. Takeda and K. Ohmuro, T. Sasabayashi, K. Okamoto, A Vertically Aligned LCD Providing Super–High Image Quality, IDW '97, pp. 159–162.

N. Koma, R. Nishikawa, Development of a High–Quality TFT–LCD for Projection Displays, SID Digest, 1997, pp. 461–464.

K. Ohmuro, S. Kataoka, T. Sasaki, Y. Koike, Development of Super–High Image Quality Vertical Alignment Mode LCD, SID Digest, 1997, pp. 845–848.

* cited by examiner

MULTI-DOMAIN LIQUID CRYSTAL DISPLAY DEVICE

BACKGROUND OF THE INVENTION

1. Field of the Invention

The present invention relates to a liquid crystal display device (LCD), and more particularly, to a liquid crystal display device having common-auxiliary electrodes and electric field inducing windows.

2. Description of the Related Art

Recently, an LCD has been proposed where the liquid crystal is not aligned and the liquid crystal is driven by side electrodes insulated from pixel electrodes. FIGS. 1a and 1b are sectional views of pixel unit of the conventional LCDs.

Regarding conventional LCDs, a plurality of gate bus lines arranged in a first direction on a first substrate and a plurality of data bus lines arranged in a second direction on the first substrate divide the first substrate into a plurality of pixel regions. A thin film transistor (TFT) applies image signal delivered from the data bus line to a pixel electrode 13 on a passivation layer 37. The TFT is formed on each pixel region and comprises a gate electrode, a gate insulator, a semiconductor layer, a source electrode, and a drain electrode, etc.

Pixel electrode 13 is formed on the gate insulator, thereon passivation layer 37 is formed over the whole first substrate, and side electrode 21 is formed surrounding the pixel electrode 13 and a part of pixel electrode 13 overlaps side electrode 21. (FIG. 1A)

Alternatively, pixel electrode 13 is formed on the gate insulator, and passivation layer 37 is formed over the whole first substrate.

On second substrate, a light shielding layer is formed to shield any light leakage from gate and data bus lines, and the TFT, a color filter layer is formed on the light shielding layer, an over coat layer is formed on the color filter layer, a common electrode 17 is formed to have open area 27 on the over coat layer, and a liquid crystal layer is formed between the first and second substrates.

The common electrode 17 is formed and applies electric field to a liquid crystal layer together with pixel electrode 13. Side electrode 21 and open area (slit) 27 distort the electric field applied to the liquid crystal layer.

Then, in a unit pixel liquid crystal molecules are driven variously. This means that when voltage is applied to the LCD, dielectric energy due to the distorted electric field arranges the liquid crystal directors in needed or desired positions.

In the LCDs, however, open area 27 in common electrode 17 or pixel electrode 13 is necessary, and the liquid crystal molecules could be driven stably when the open area is wider. If the electrodes do not have an open area or the width of the open area is narrow, the electric field distortion needed to divide the pixel region becomes weak. Then, when voltage over a threshold voltage, $V_{th}$, is applied, the time needed to stabilize the liquid crystal directors increases.

At this time, disclination occurs from the area where the liquid crystal directors are parallel with a transmittance axis of the polarizer, which results in a decrease in brightness. Further, according to the surface state of LCDs, the liquid crystal texture has an irregular structure.

SUMMARY OF THE INVENTION

Accordingly, the present invention is directed to an LCD that substantially obviates one or more problems due to limitations and disadvantages of the related art.

An object of the present invention is to provide a multi-domain LCD having high response time characteristics and high brightness by stable arrangement of liquid crystal molecules.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device comprises first and second substrates facing each other; a plurality of gate bus lines arranged in a first direction on the first substrate and a plurality of data bus lines arranged in a second direction on the first substrate to define a pixel region; a common-auxiliary electrode surrounding the pixel region on a same layer whereon the gate bus line is formed; a gate insulator over the whole first substrate; a passivation layer on the gate insulator over the whole first substrate; a pixel electrode in the pixel region, the pixel electrode having an electric field inducing window in the inner part thereof; a light shielding layer on the second substrate; a color filter layer on the light shielding layer; a common electrode on the color filter layer; an alignment layer on at least one substrate between the first and second substrates; and a liquid crystal layer between the first and second substrates.

The liquid crystal layer includes liquid crystal molecules having positive or negative dielectric anisotropy.

The multi-domain liquid crystal display device further comprises a negative uniaxial or negative biaxial film on at least one substrate.

The liquid crystal layer includes chiral dopants.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings.

DETAILED DESCRIPTION OF THE PREFERRED EMBODIMENTS

Hereinafter, the multi-domain liquid crystal display device of the present invention is explained in detail by accompanying the drawings.

Figure 1A:
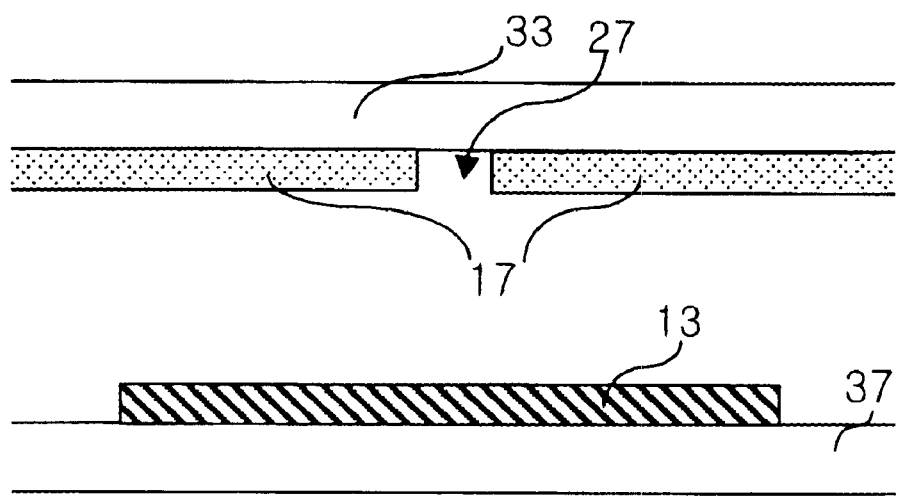
FIGS. 1A and 1B are sectional views of the liquid crystal display devices in the related art.
Figure 1B:
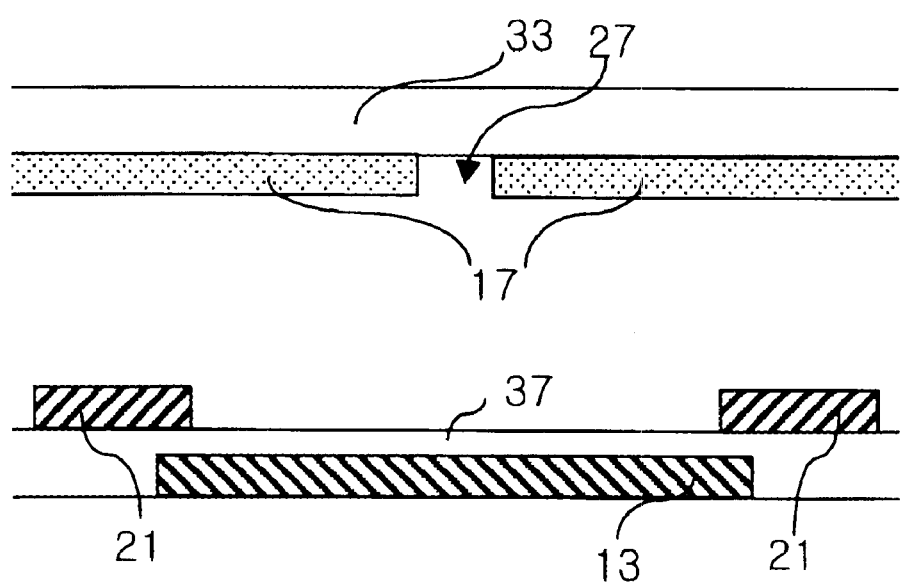
Figure 2A:
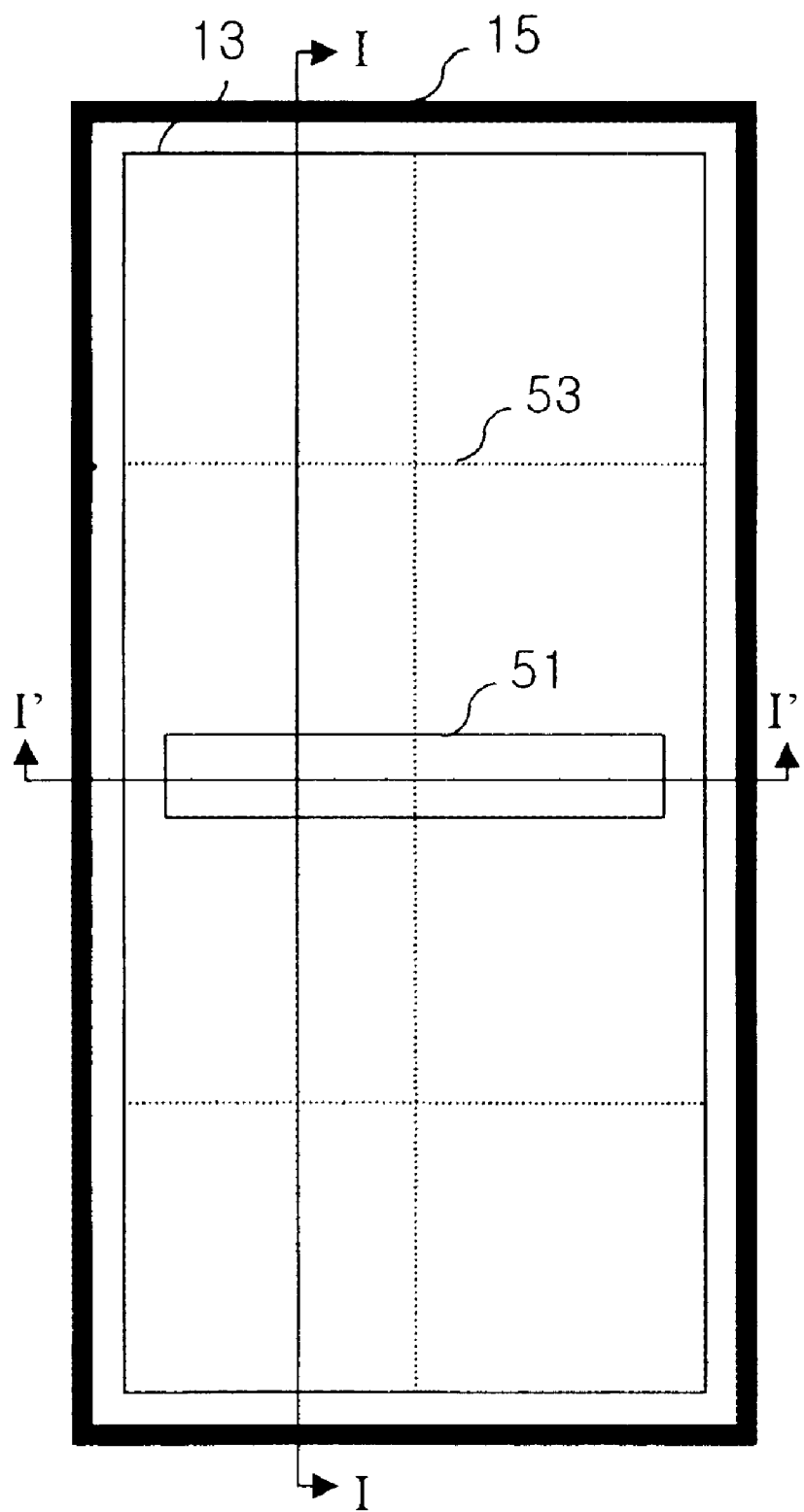
FIGS. 2A, 2B, 2C, 2D, 2E, and 2F are plan views of the multi-domain liquid crystal display devices according to the embodiments of the present invention.
Figure 2B:
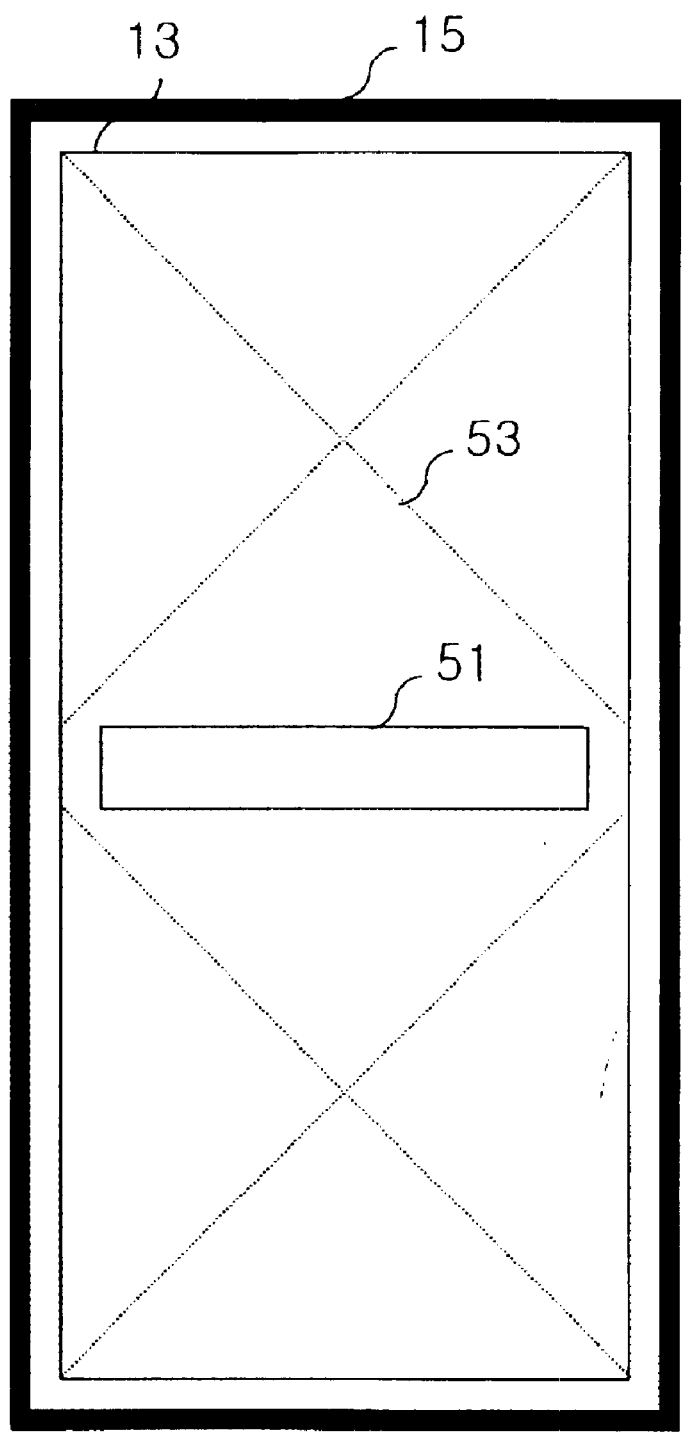
Figure 2C:
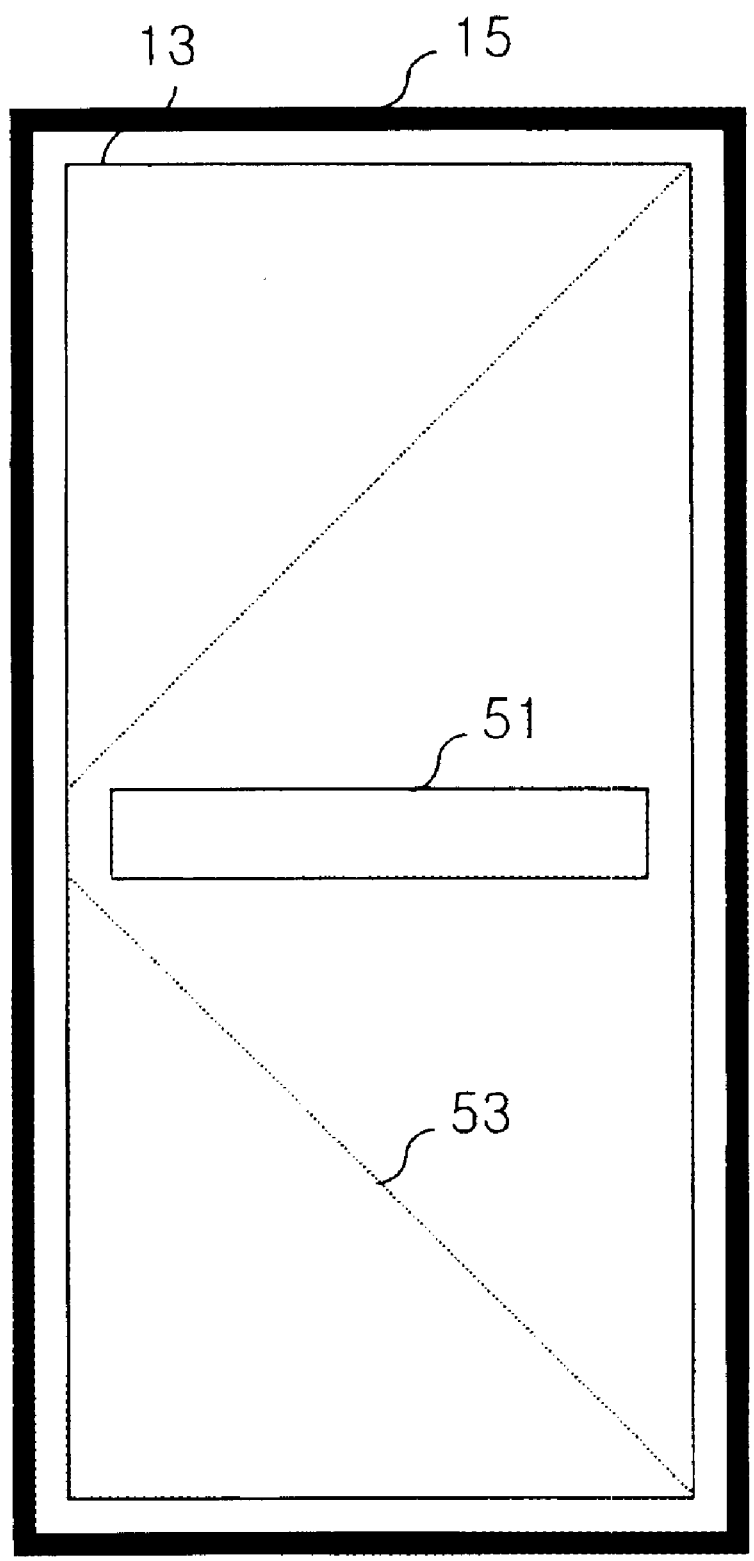
Figure 2D:
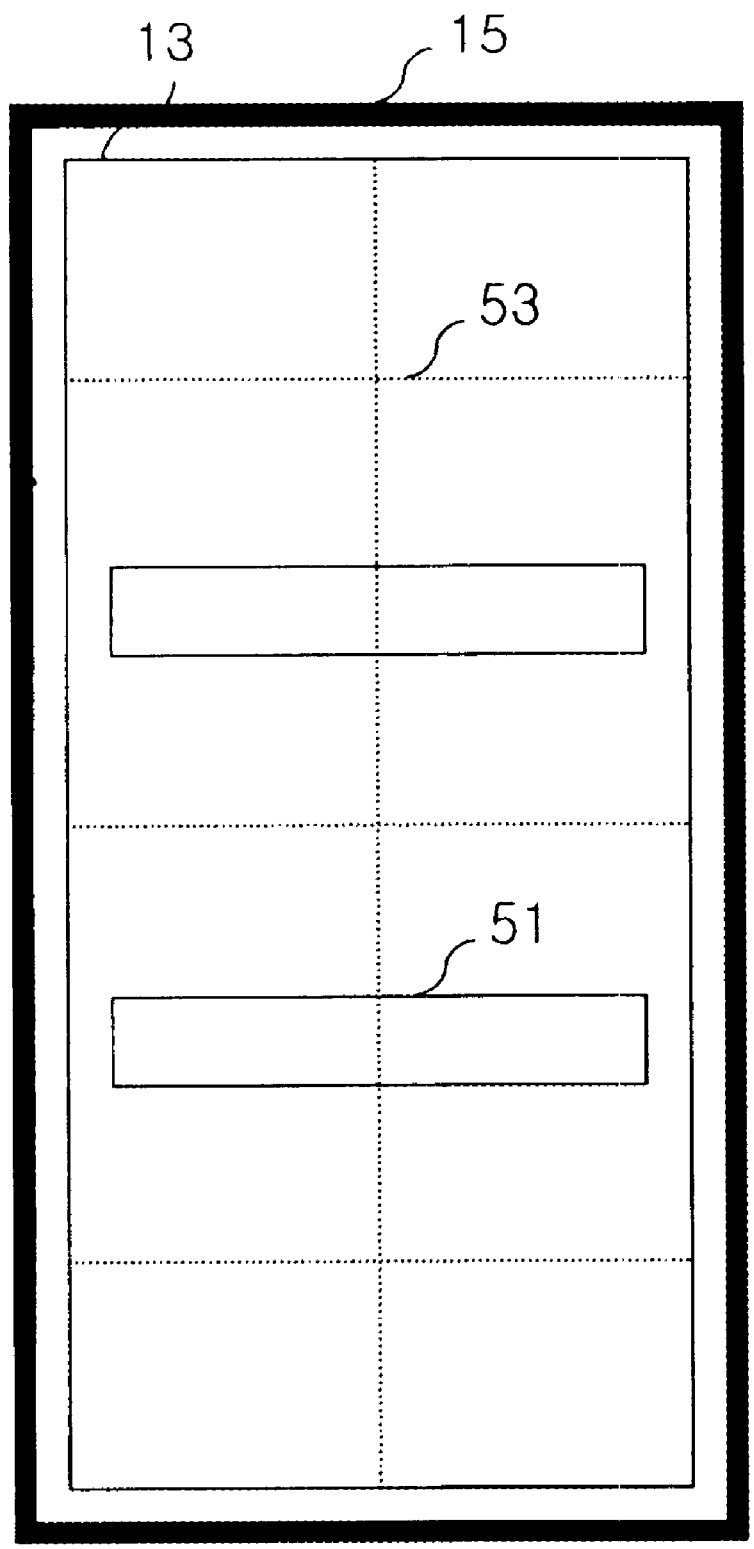
Figure 2E:
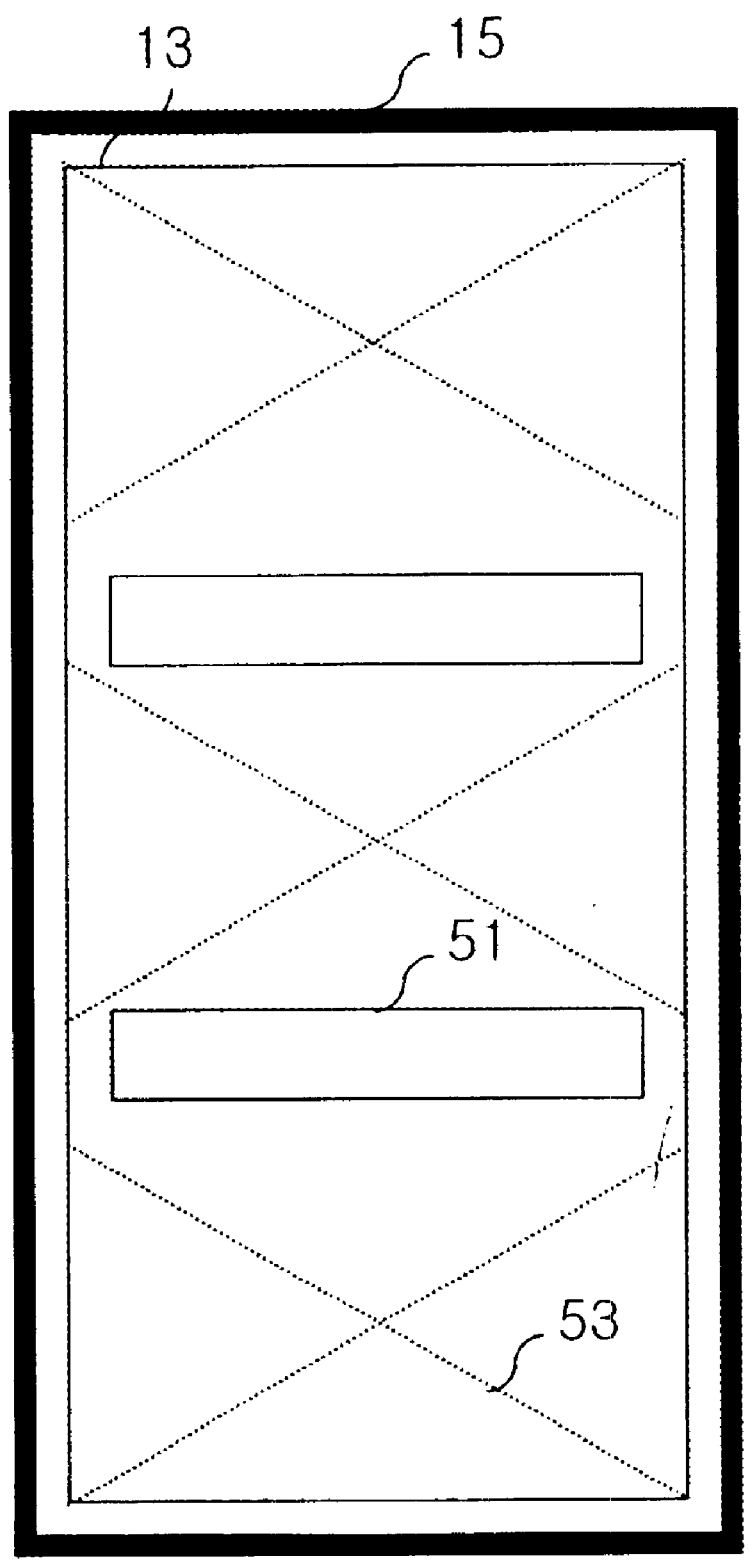
Figure 2F:
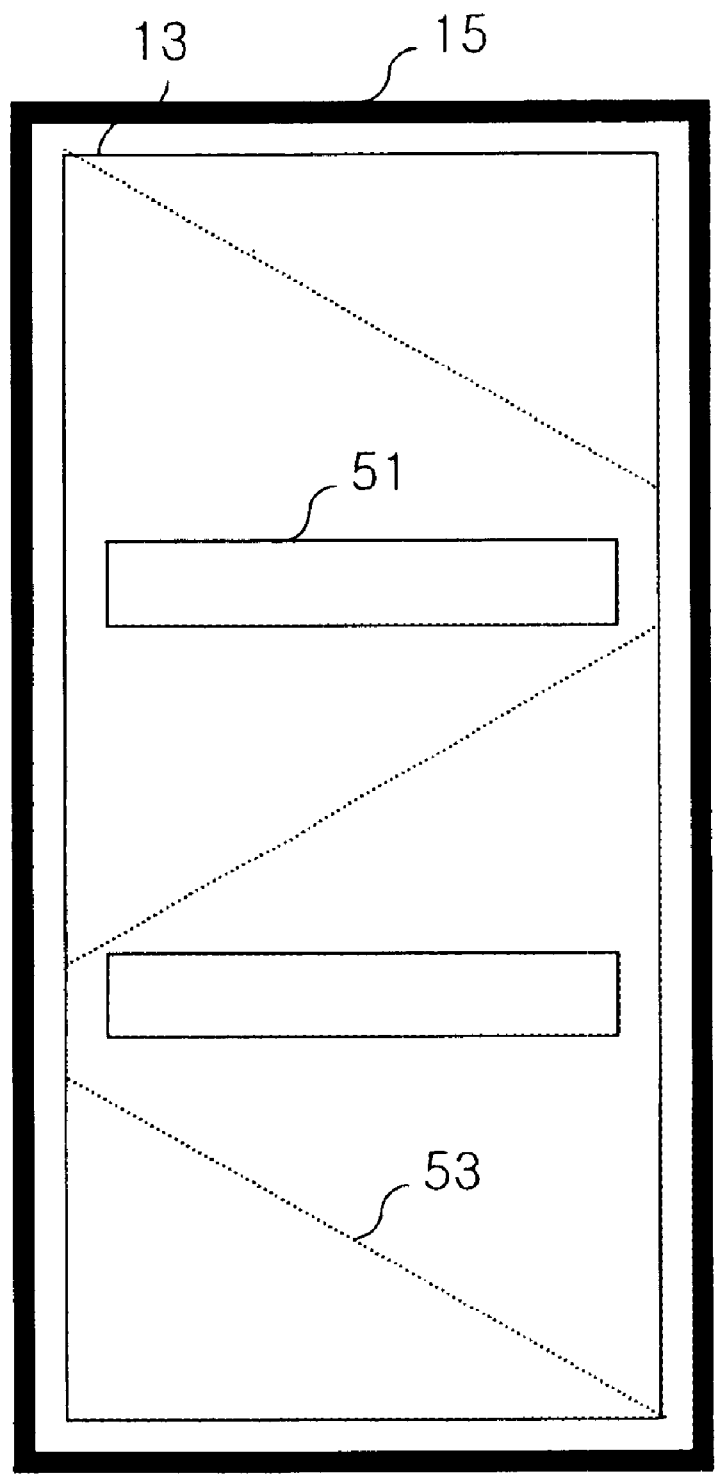

FIGS. 2A, 2B, 2C, 2D, 2E, and 2F are plan views of the multi-domain liquid crystal display devices according to the embodiments of the present invention, FIGS. 3A, 3B, 3C, 3D, and 3E are sectional views taken along the lines I—I and I'–I' of FIG. 2A according to the embodiments of the present invention.

Figure 4A:
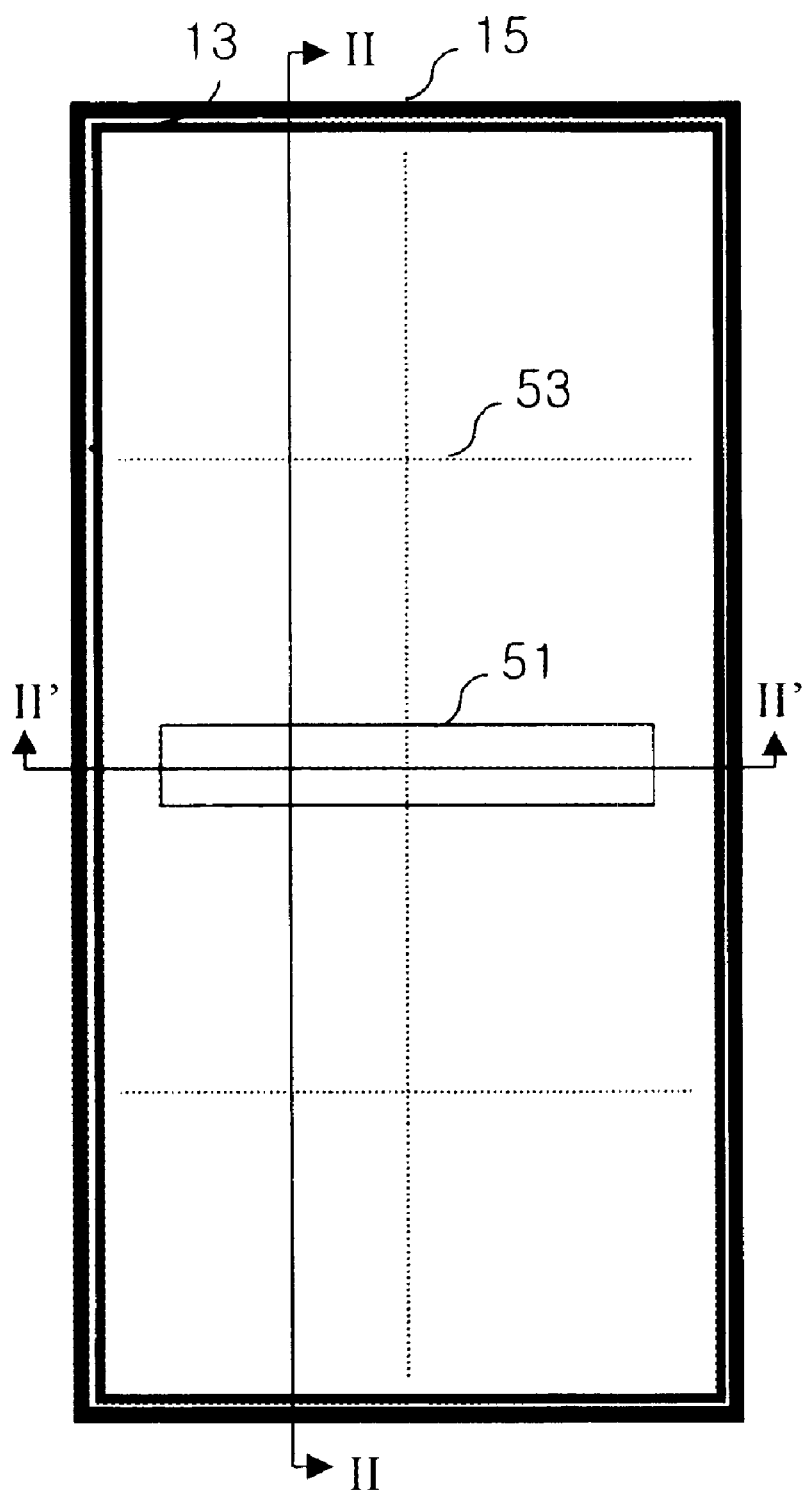
FIGS. 4A, 4B, 4C, 4D, 4E, and 4F are plan views of the multi-domain liquid crystal display devices according to the embodiments of the present invention.
Figure 4B:
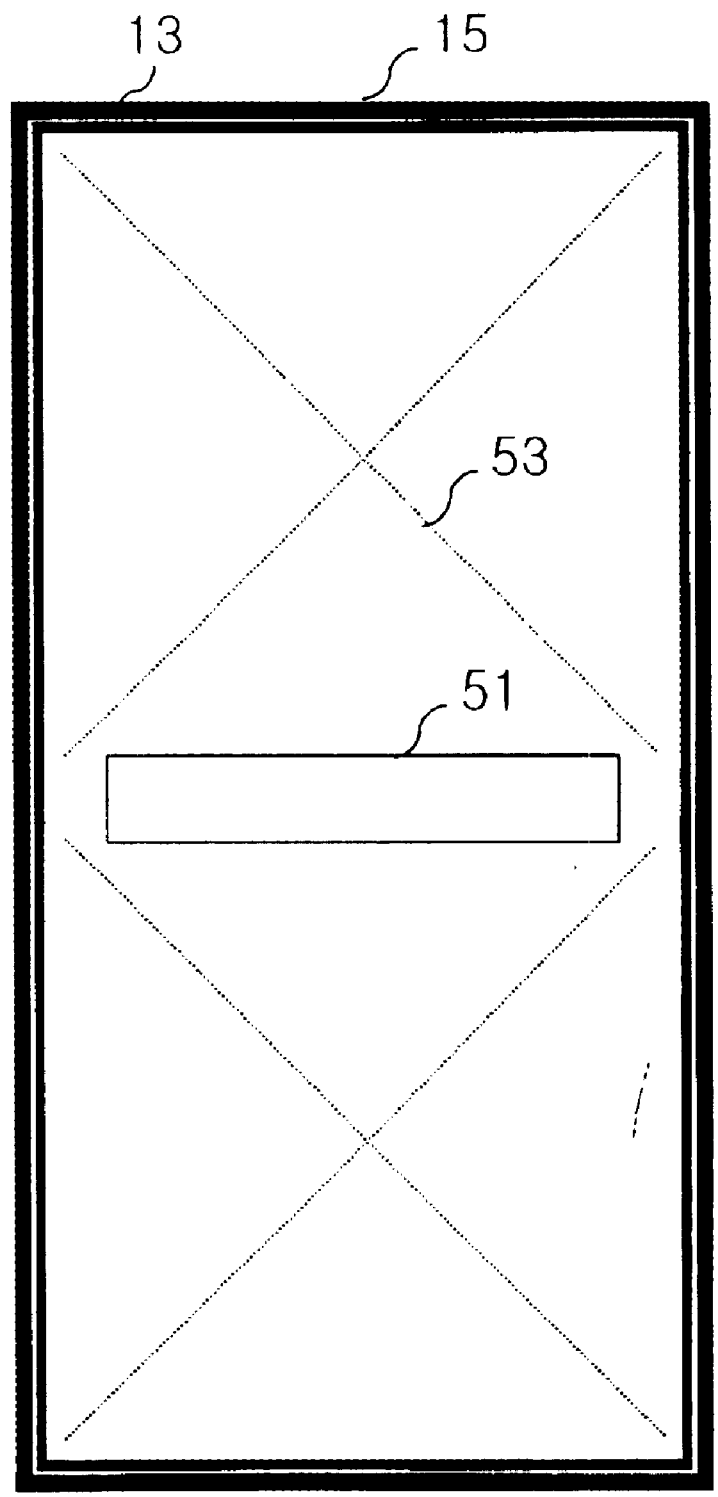
Figure 4C:
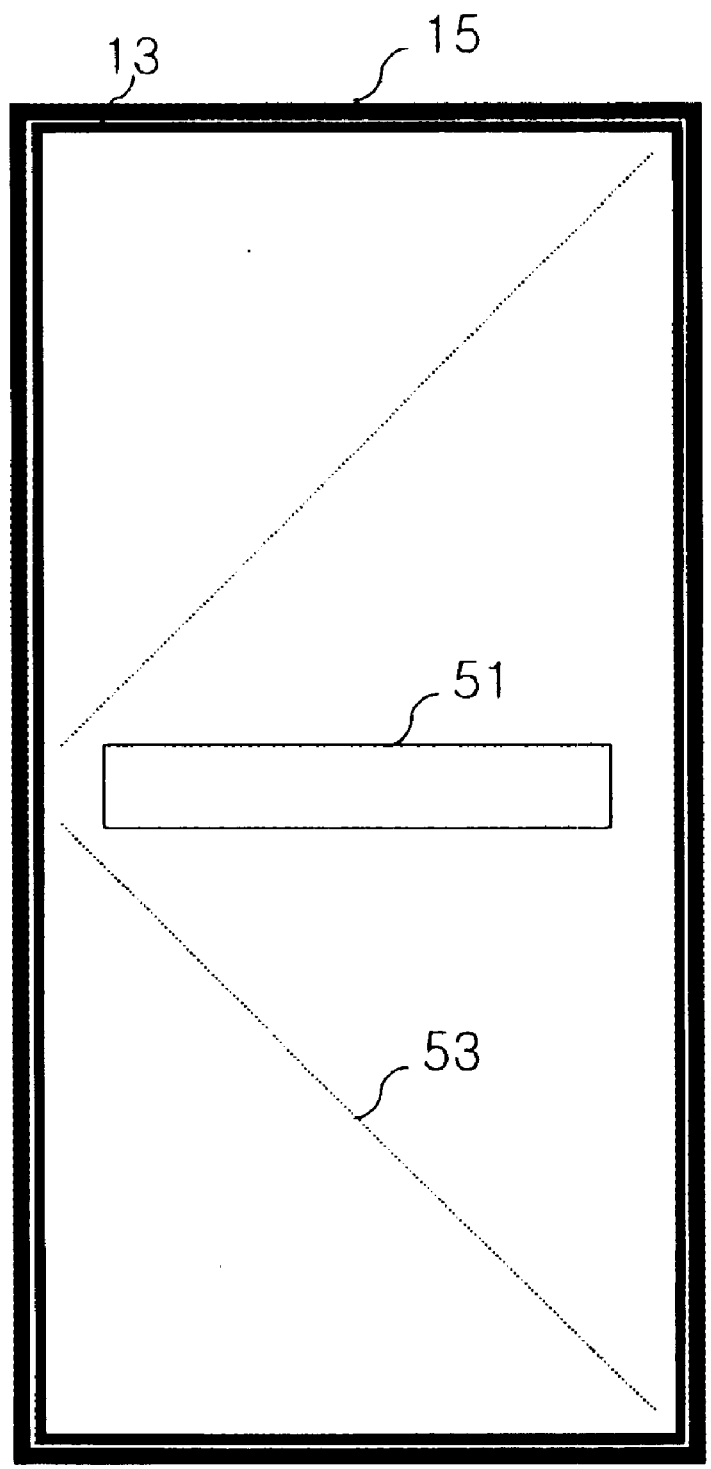
Figure 4D:
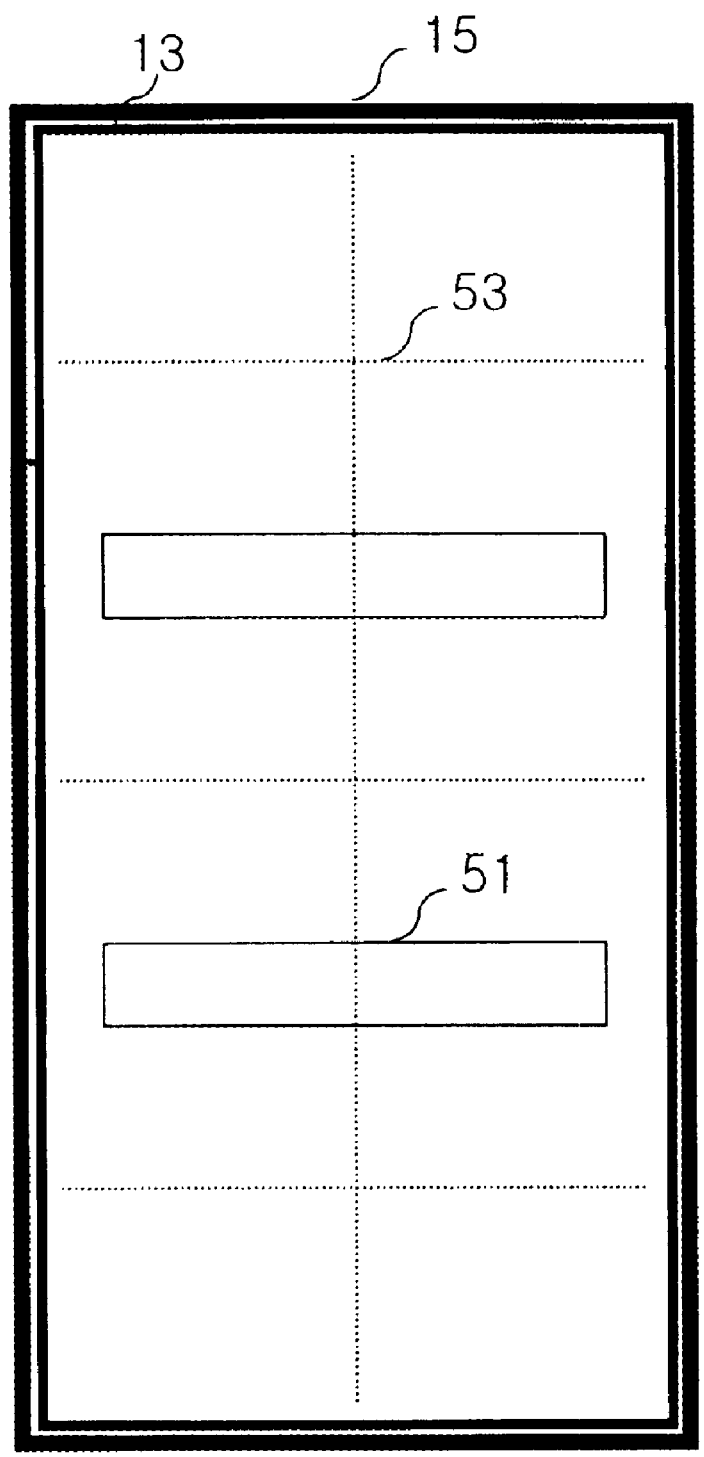
Figure 4E:
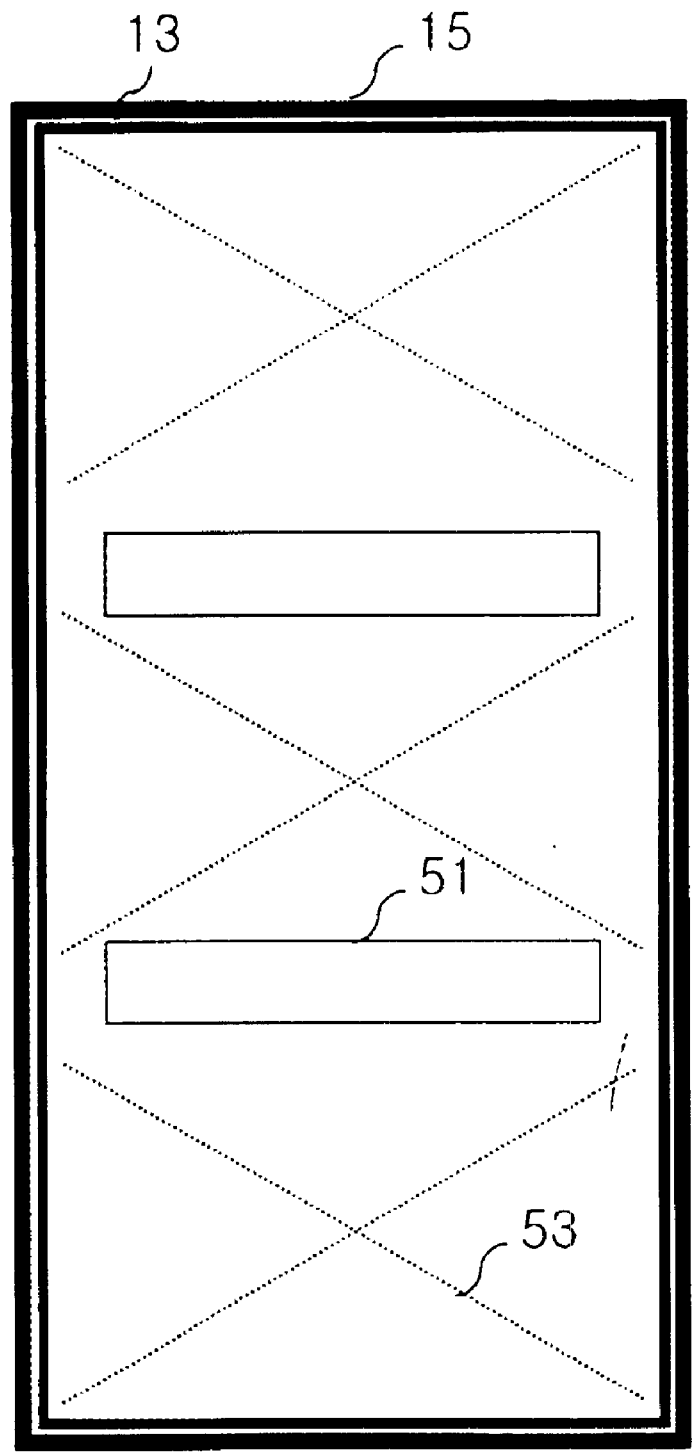
Figure 4F:
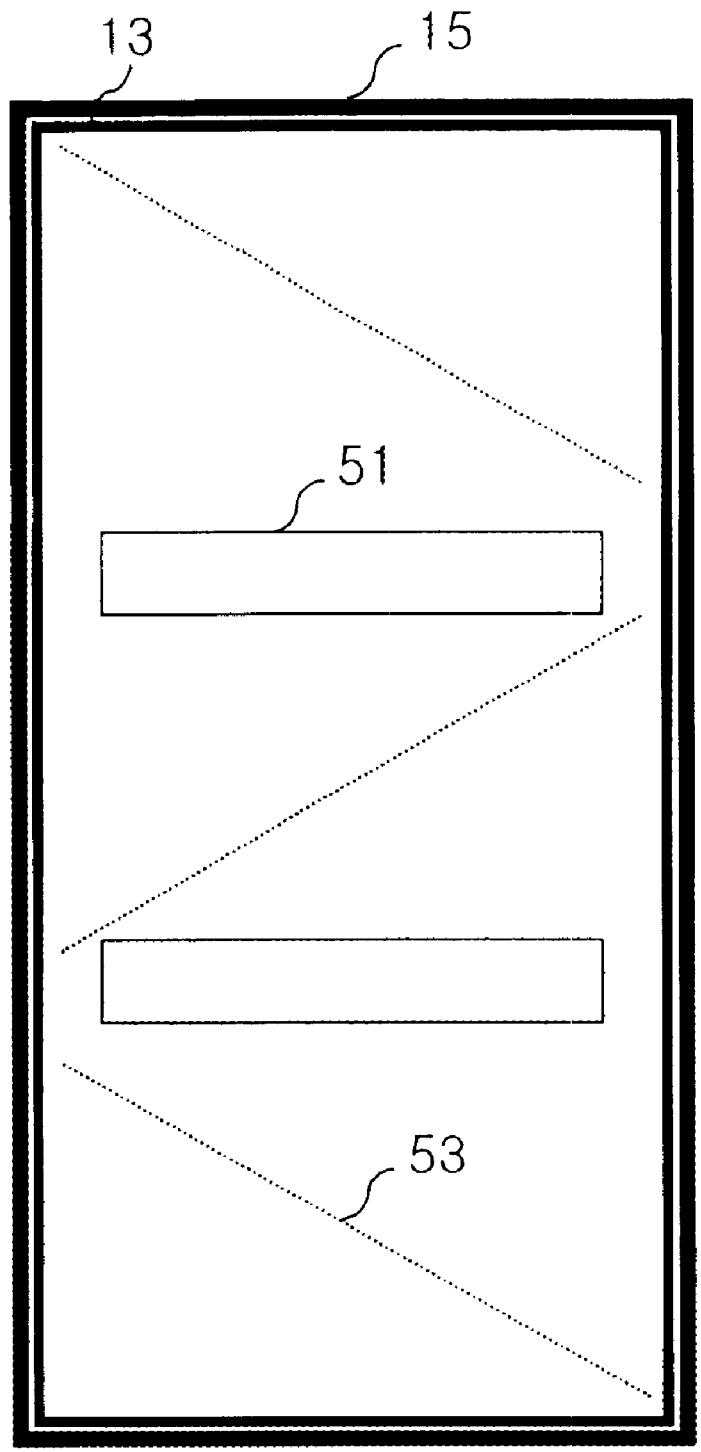

FIGS. 4A, 4B, 4C, 4D, 4E, and 4F are plan views of the multi-domain liquid crystal display devices according to the embodiments of the present invention, FIGS. 5A, 5B, 5C, 5D, and 5E are sectional views taken along the lines II—II and II'–II' of FIG. 4A according to the embodiments of the present invention.

As shown in the figures, the present invention comprises first and second substrates 31, 33, a plurality of gate bus lines 1 arranged in a first direction on the first substrate and a plurality of data bus lines 3 arranged in a second direction on the first substrate, a common-auxiliary electrode 15, a TFT, a passivation layer 37, and a pixel electrode 13.

Data bus lines 3 and gate bus lines 1 divide the first substrate into a plurality of pixel regions. The common-auxiliary electrode 15 distorts electric field on a same layer whereon the gate bus line is formed. The TFT is formed on each pixel region and comprises a gate electrode, a gate insulator 35, a semiconductor layer, an ohmic contact layer, and source/drain electrodes.

Passivation layer 37 is formed on the whole first substrate 31. Pixel electrode 13 is coupled to the drain electrode and has electric field inducing window 51 like hole or slit in its inner part.

On the second substrate 33, a light shielding layer 25 is formed to shield the light leaked from gate and data bus lines 1, 3, and the TFT, a color filter layer 23 is formed on the light shielding layer, a common electrode 17 is formed on the color filter layer, and a liquid crystal layer is formed between the first and second substrates 31, 33.

The common electrode 17 has dielectric frames 53 thereon, or has electric field inducing window 51 like hole or slit in its inner part.

To manufacture the multi-domain LCD of the present invention, in each pixel region on the first substrate, a TFT is formed comprising gate electrode, gate insulator 35, semiconductor layer, ohmic contact layer and source/drain electrodes. At this time, a plurality of gate bus lines 1 and a plurality of data bus lines 3 are formed to divide the first substrate 31 into a plurality of pixel regions.

Gate electrode and gate bus line 1 are formed by sputtering and patterning a metal such as Al, Mo, Cr, Ta, or Al alloy, etc. At this time, common-auxiliary electrode 15 is formed surrounding the pixel region. The gate insulator 35 is formed by depositing $SiN_x$ or $SiO_x$ using PECVD thereon.

The semiconductor layer and the ohmic contact layer are formed by depositing with PECVD (Plasma Enhanced Chemical Vapor Deposition), and patterning amorphous silicon (a-Si) and doped amorphous silicon ($n^+$ a-Si), respectively. Also, gate insulator 35, amorphous silicon (a-Si), and doped amorphous silicon ($n^+$ a-Si) are formed by PECVD and patterned.

Data bus line 3 and source/drain electrodes are formed by sputtering and patterning a metal such as Al, Mo, Cr, Ta, or Al alloy, etc.

A storage electrode is formed to overlap gate bus line 1 and/or common-auxiliary electrode 15 at the same time, the storage electrode makes a storage capacitor with gate bus line 1 and/or common-auxiliary electrode 15.

Subsequently, passivation layer 37 is formed with BCB (BenzoCycloButene), acrylic resin, polyimide based material, $SiN_x$ or $SiO_x$ on the whole first substrate 31. Pixel electrode 13 is formed by sputtering and patterning a metal such as ITO (indium tin oxide). A contact hole is formed to connect the pixel electrode to the drain and storage electrodes by opening and patterning a part of the passivation layer 37 on the drain electrode.

When common-auxiliary electrode 15 and gate bus line 1 are formed with the same material, the common-auxiliary and gate electrodes are simultaneously formed with one mask and connected electrically to common electrode 17, or it is possible to form them with different materials or double layer with additional masks.

On the second substrate 33, a light shielding layer 25 is formed to shield any light leakage from gate and data bus lines 1, 3, the TFT, and common-auxiliary electrode 15. A color filter layer 23 is formed R, G, B (red, green, blue) elements to alternate on the light shielding layer. A common electrode 17 is formed with ITO on the color filter layer, and a liquid crystal layer is formed by injecting liquid crystal between the first and second substrates 31, 33.

On the common electrode 17, dielectric frames 53 are formed by depositing photosensitive material and patterning in various shapes using photolithography. The dielectric frame 53 includes material of which dielectric constant is same or smaller than that of the liquid crystal, and the dielectric constant thereof is preferably below 3, for example, photoacrylate or BCB (BenzoCycloButene).

Figure 3A:
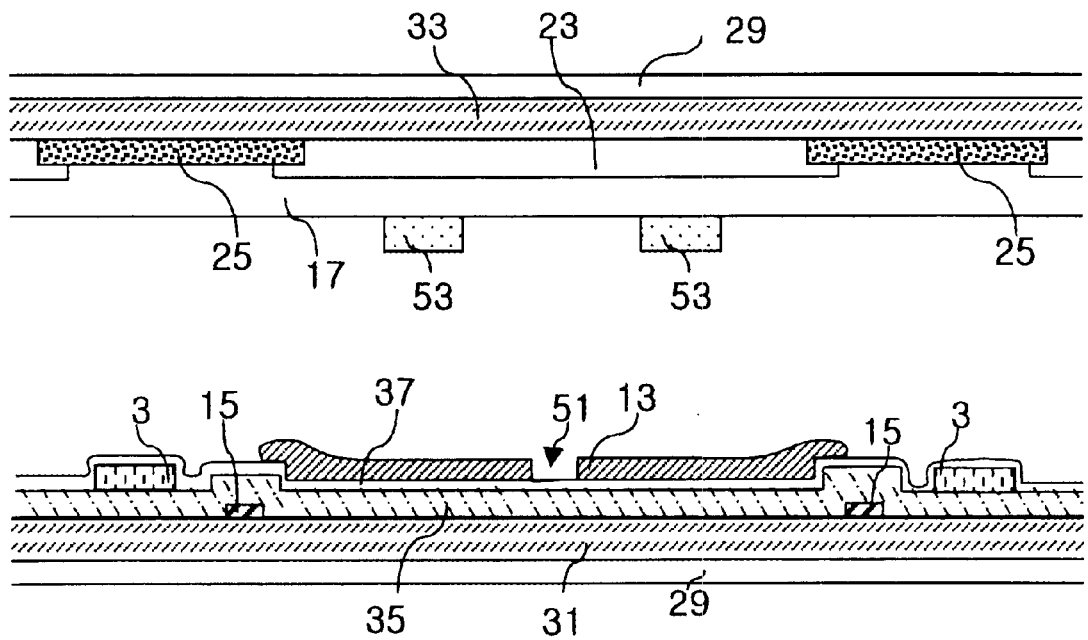
FIGS. 3A, 3B, 3C, 3D, and 3E are sectional views taken along the lines I—I and I'–I' of FIG. 2A according to the embodiments of the present invention.
Figure 3B:
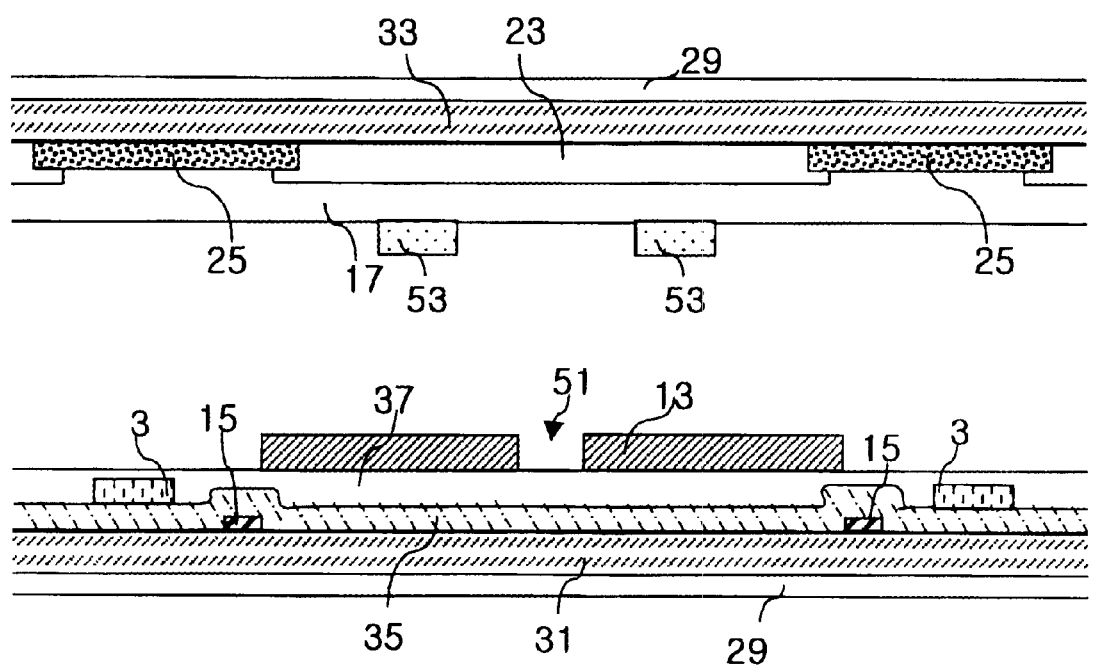

Furthermore, the dielectric frame 53 is formed on at least one substrate between the first and second substrates (refer to FIGS. 3A and 3B). And, an electric field inducing window 51 is formed on at least one substrate between the first and second substrates (refer to FIGS. 3C and 3D).

At this time, the dielectric frame and electric field inducing window are formed on same substrate together. The electric field inducing window 51 is formed by patterning hole or slit in the common electrode 17 or pixel electrode 13.

To apply voltage ($V_{com}$) to common-auxiliary electrode 15, Ag-dotting part is formed in each corner of driving area on first substrate 31, electric field is applied with second substrate 33, and the liquid crystal molecules are driven by the potential different. A voltage ($V_{com}$) is applied to common-auxiliary electrode 15 by connecting the Ag-dotting part to the common-auxiliary electrode, which is accomplished simultaneously by forming the common-auxiliary electrode.

On at least one substrate, a compensation film 29 is formed with polymer. The compensation film is a negative uniaxial film, which has one optical axis, and compensates the phase difference of the direction according to viewing-angle. Hence, it is possible to compensate effectively the right-left viewing-angle by widening the area without gray inversion, increasing contrast ratio in an inclined direction, and forming one pixel to multi-domain.

In the present multi-domain liquid crystal display device, it is possible to form a negative biaxial film as the compensation film, which has two optical axes and wider viewing-angle characteristics as compared with the negative uniaxial film. The compensation film could be formed on both substrates or on one of them.

After forming the compensation film, polarizer is formed on at least one substrate. At this time, the compensation film and polarizer are preferably composed as one.

In the FIGS. 2 and 3, pixel electrode 13 does not overlap common-auxiliary electrode 15, and light shielding layer 25 overlaps the pixel electrode 13 to shield the light leakage of the LCD.

In the multi-domain liquid crystal display device in the FIGS. 4 and 5, pixel electrode 13 overlaps common-auxiliary electrode 15, light shielding layer 25 overlaps the common-auxiliary electrode 15, and then the aperture ratio is improved.

Figure 3C:
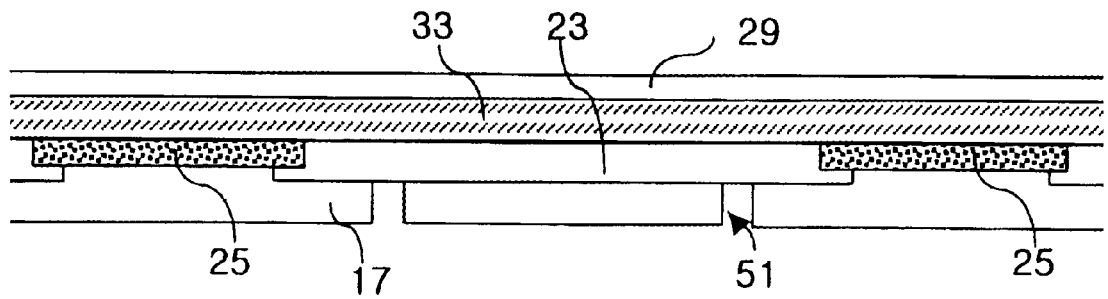
Figure 3C:
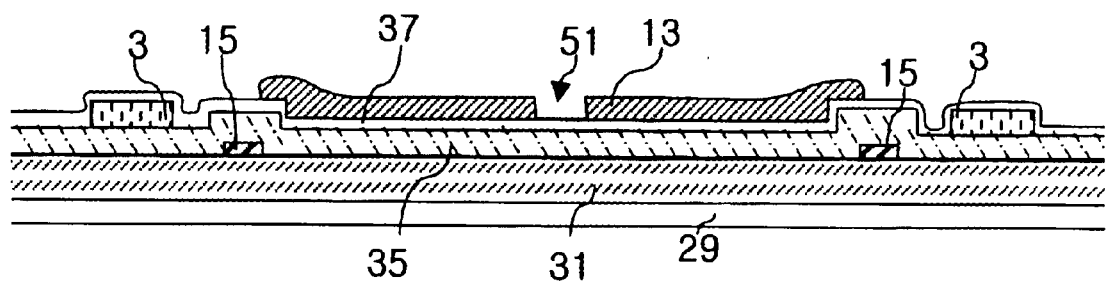
Figure 3D:
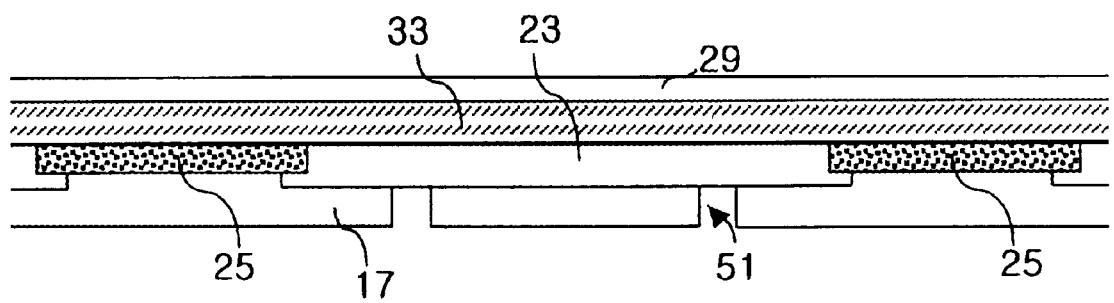
Figure 3D:
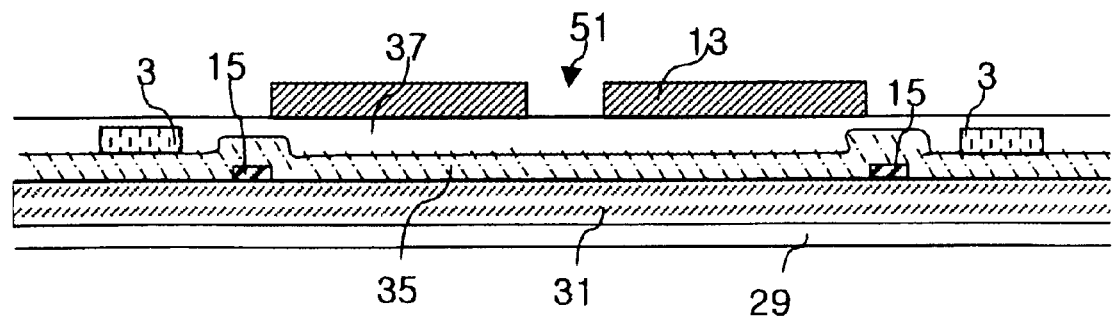
Figure 3E:
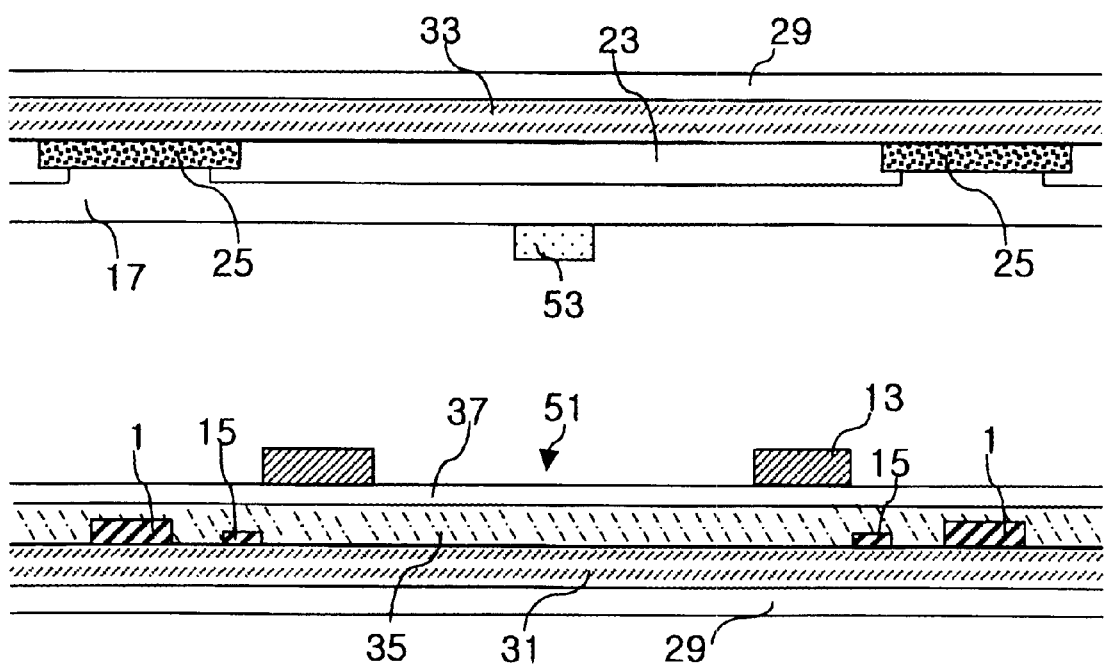
Figure 5A:
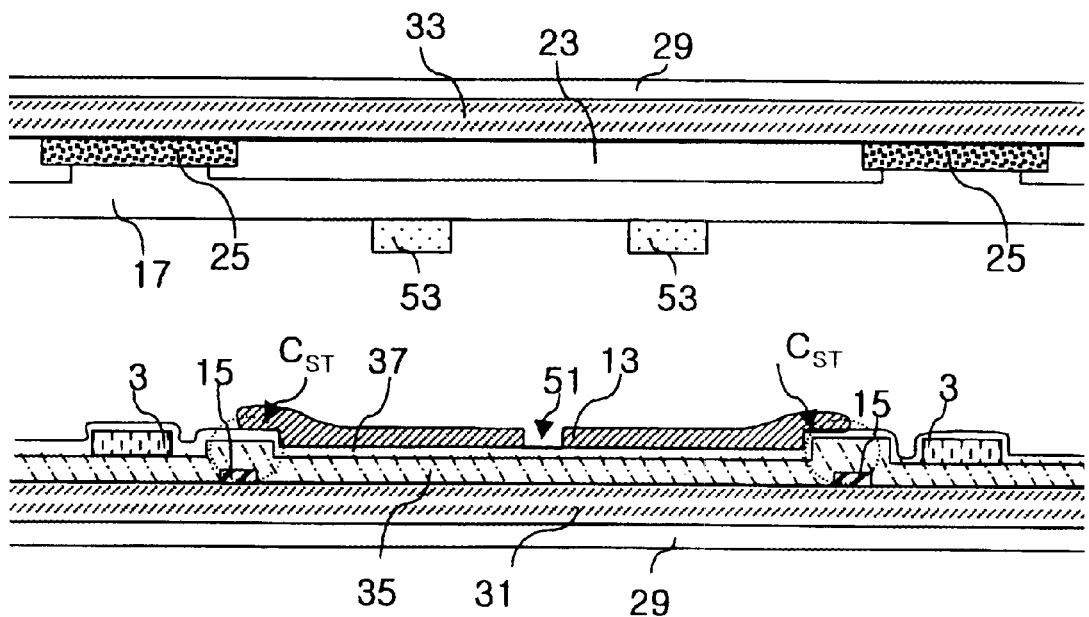
FIGS. 5A, 5B, 5C, 5D, and 5E are sectional views taken along the lines II—II and II'–II' of FIG. 4A according to the embodiments of the present invention.
Figure 5B:
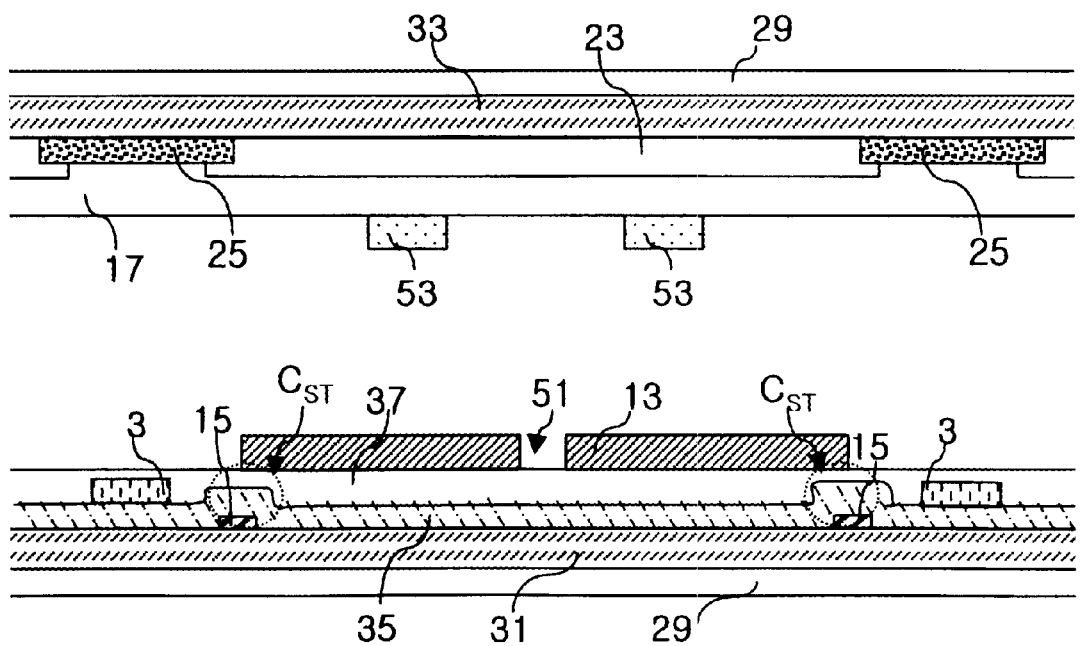
Figure 5C:
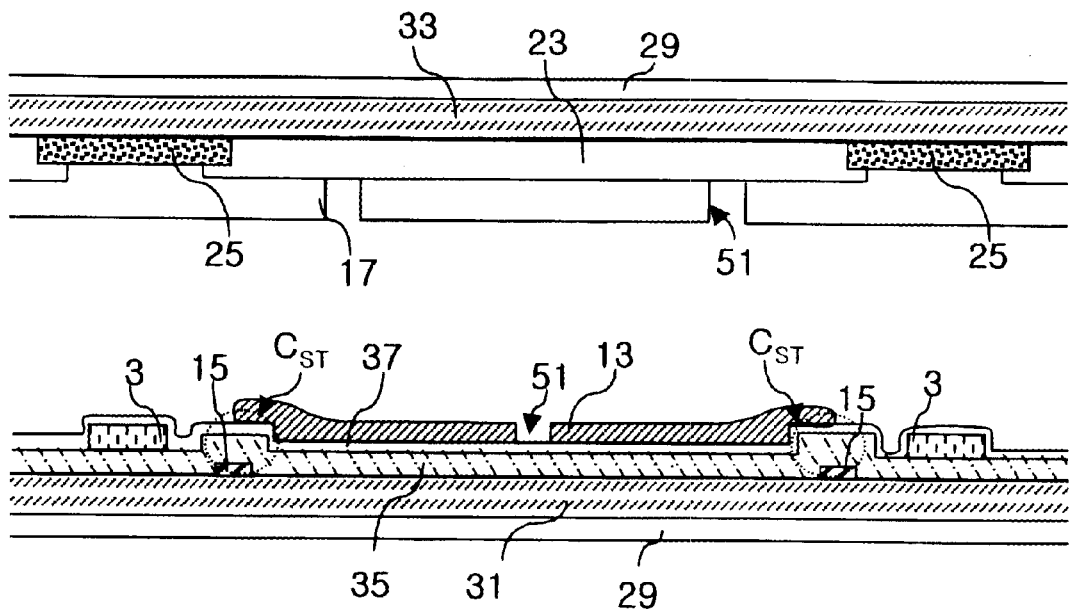
Figure 5D:
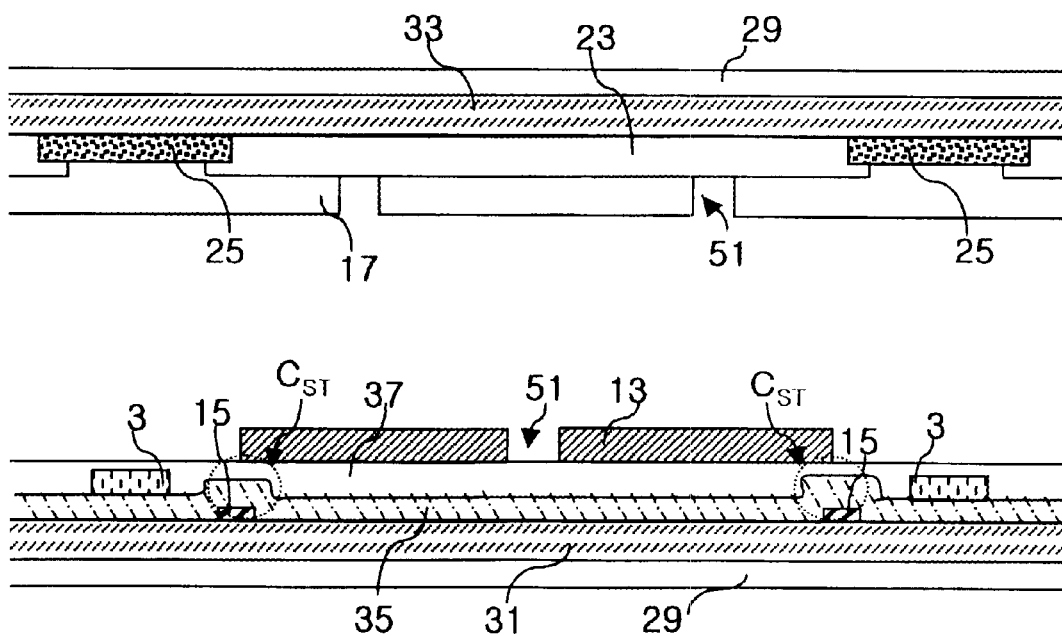
Figure 5E:
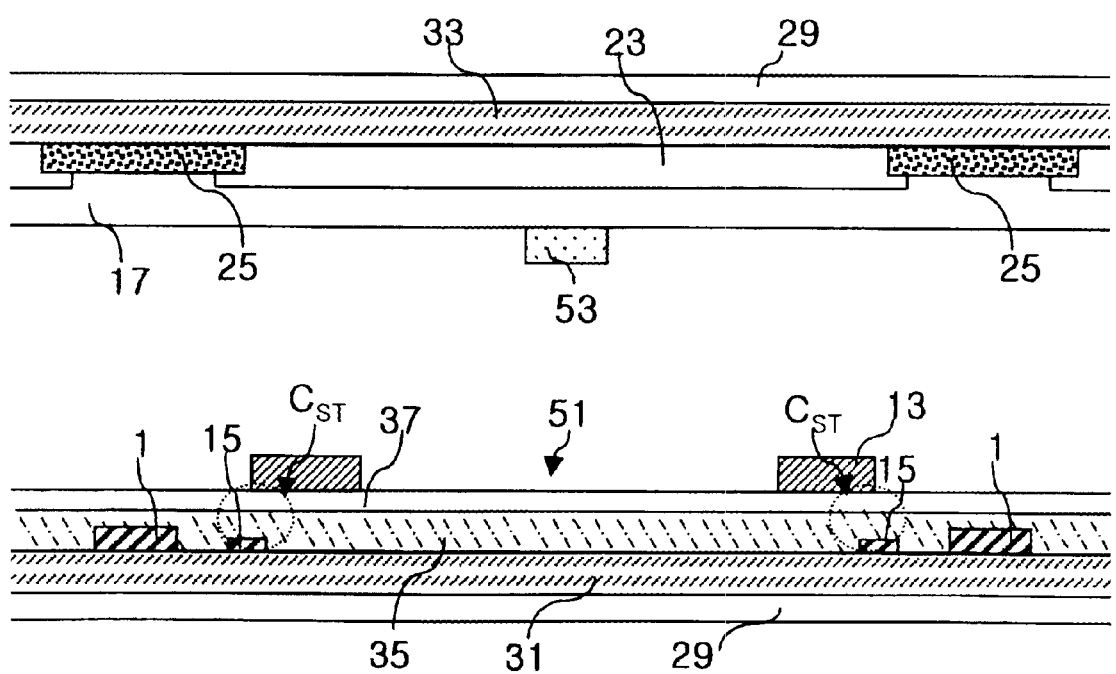

FIGS. 3A, 3C, 5A, SC show that passivation layer 37 includes $SiN_x$ or $SiO_x$ and FIGS. 3B, 3D, 5B, SD show that passivation layer 37 includes BCB or acrylic resin in the LCD. Also, FIGS. 3A, 3B, 5A, 5B show that dielectric frame 53 is formed on the common electrode 17, and FIGS. 3C, 3D, SC, SD show that electric field inducing window 51 is formed in the common electrode 17.

Figure 6A:
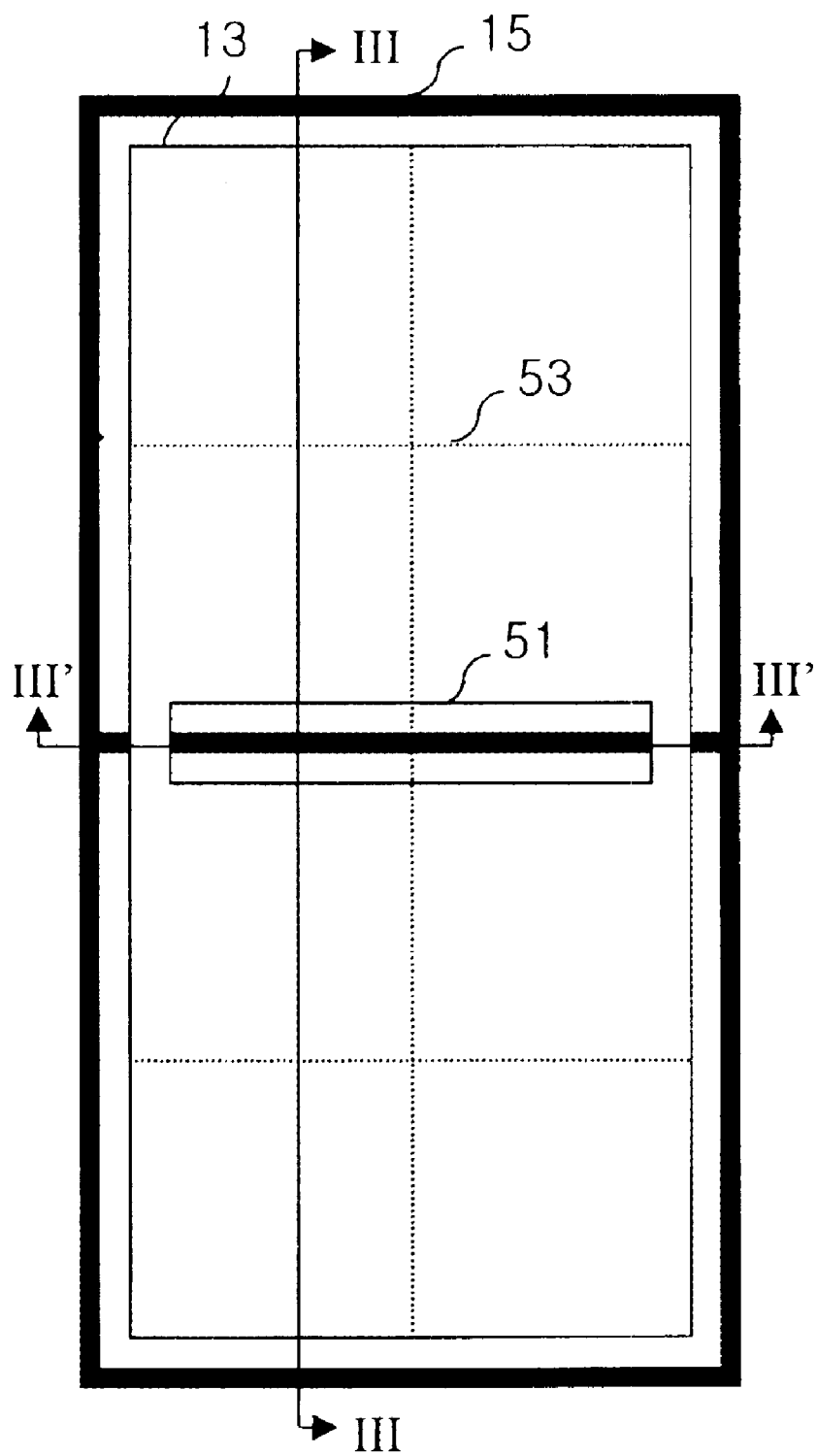
FIGS. 6A, 6B, 6C, 6D, 6E, and 6F are plan views of the multi-domain liquid crystal display devices according to the embodiments of the present invention.
Figure 6B:
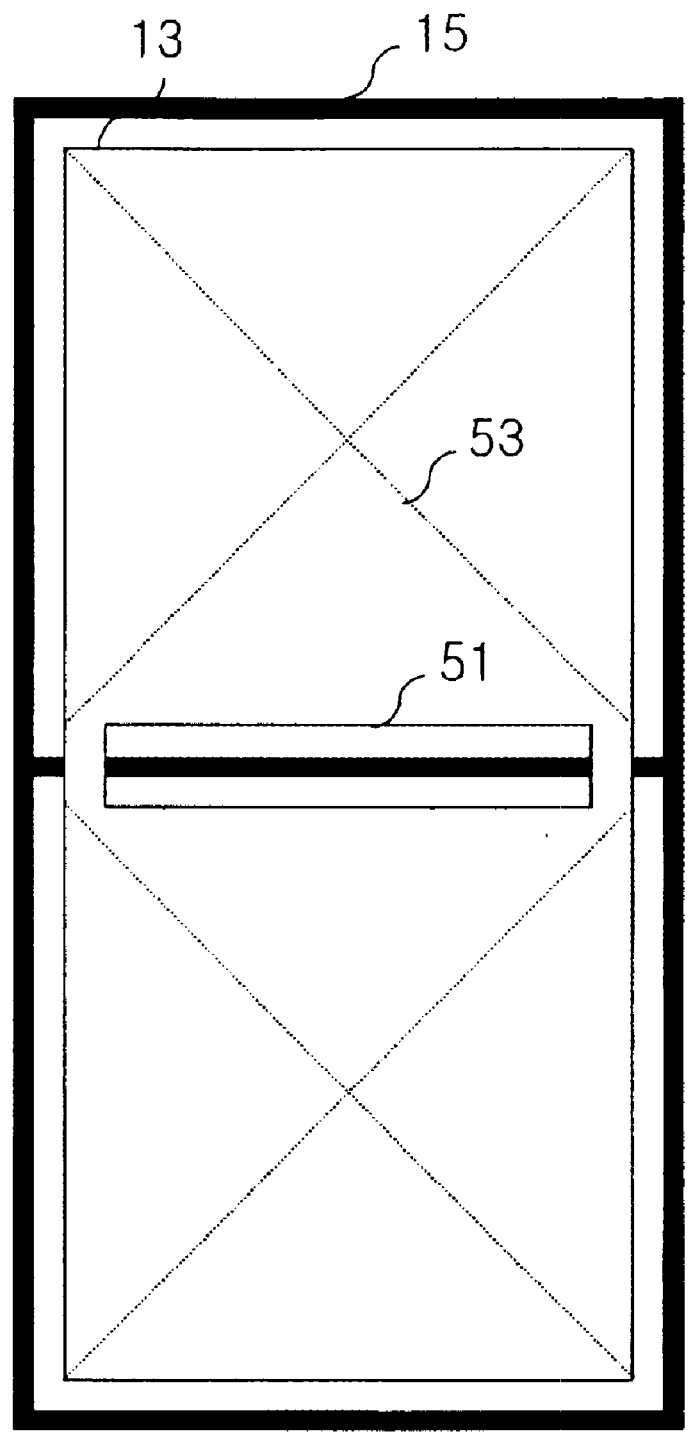
Figure 6C:
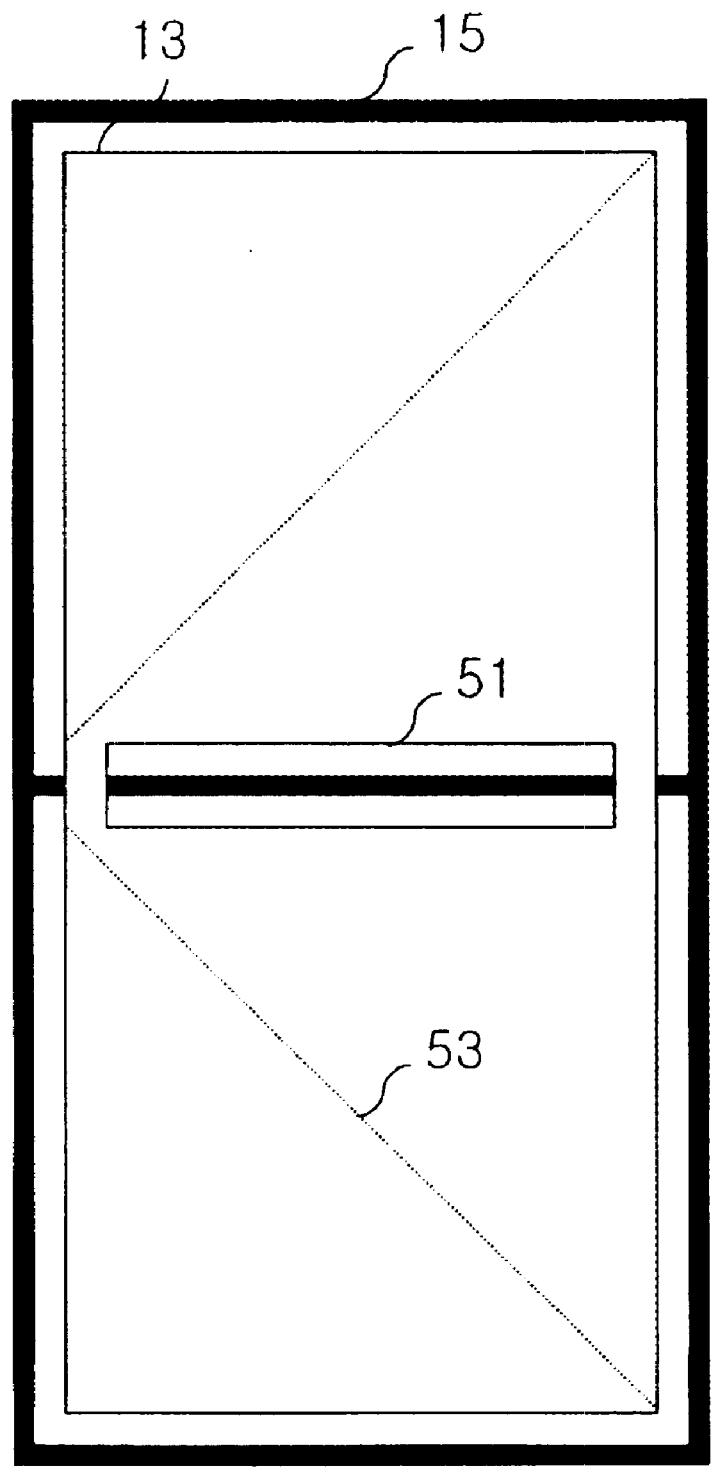
Figure 6D:
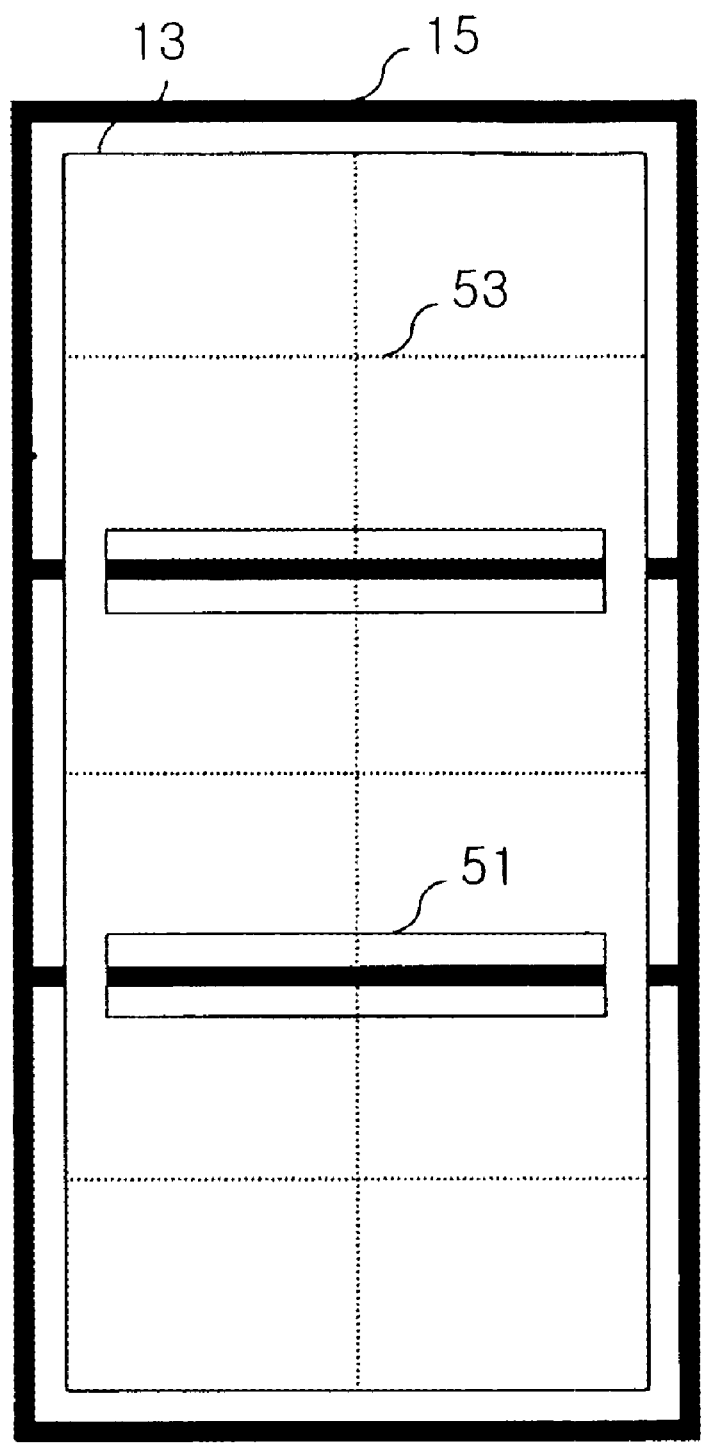
Figure 6E:
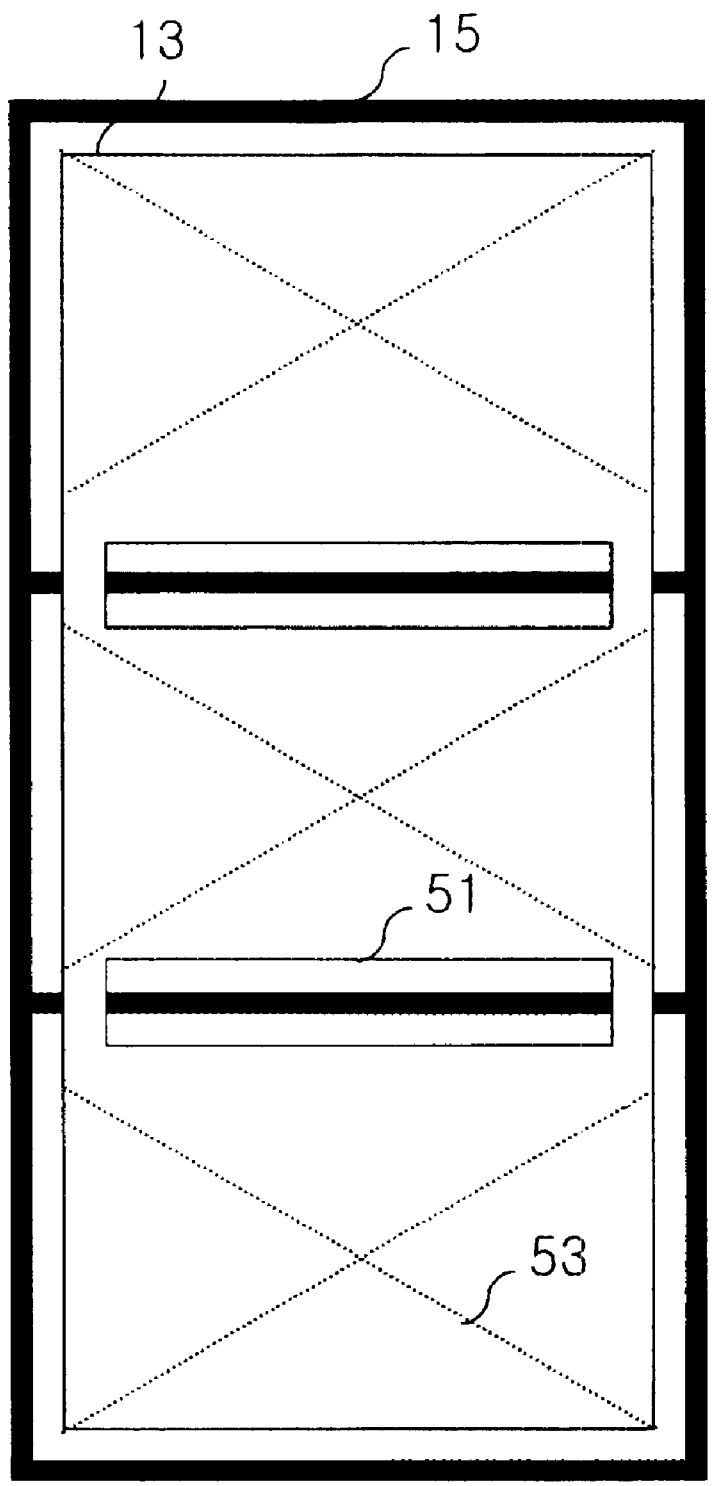
Figure 6F:
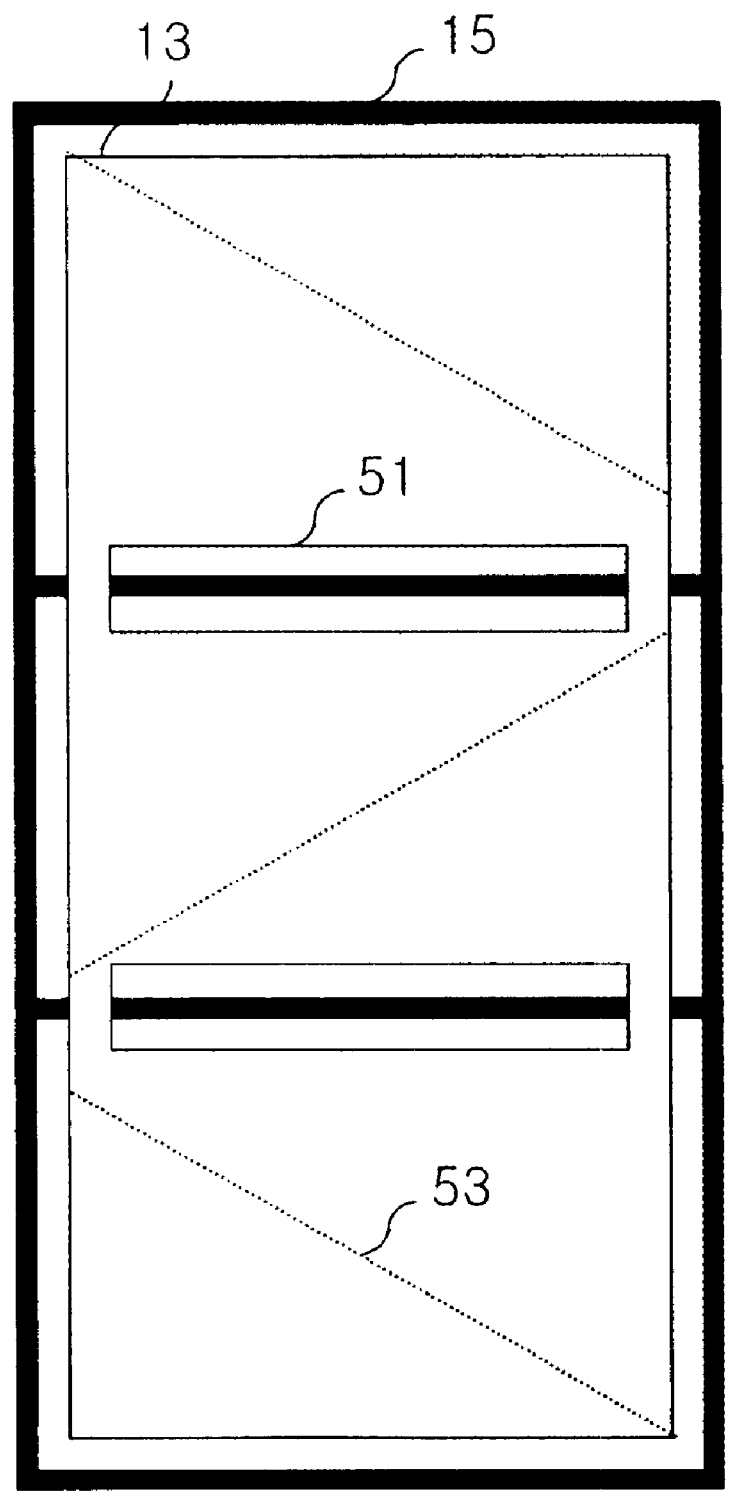
Figure 7A:
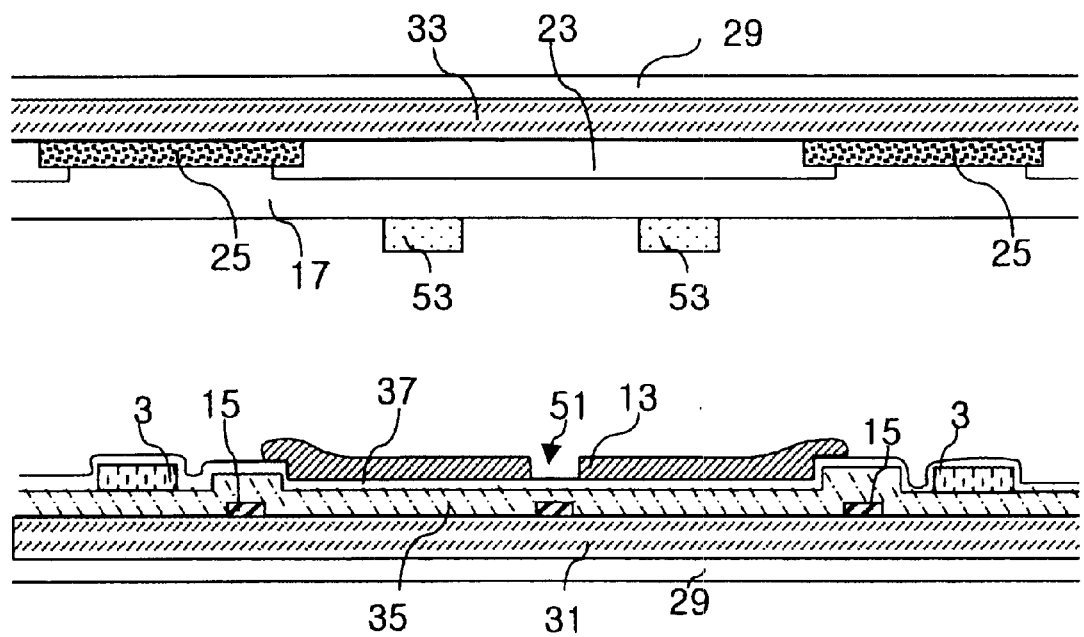
FIGS. 7A, 7B, 7C, 7D, and 7E are sectional views taken along the lines III—III and III'–III' of FIG. 6A according to the embodiments of the present invention.
Figure 7B:
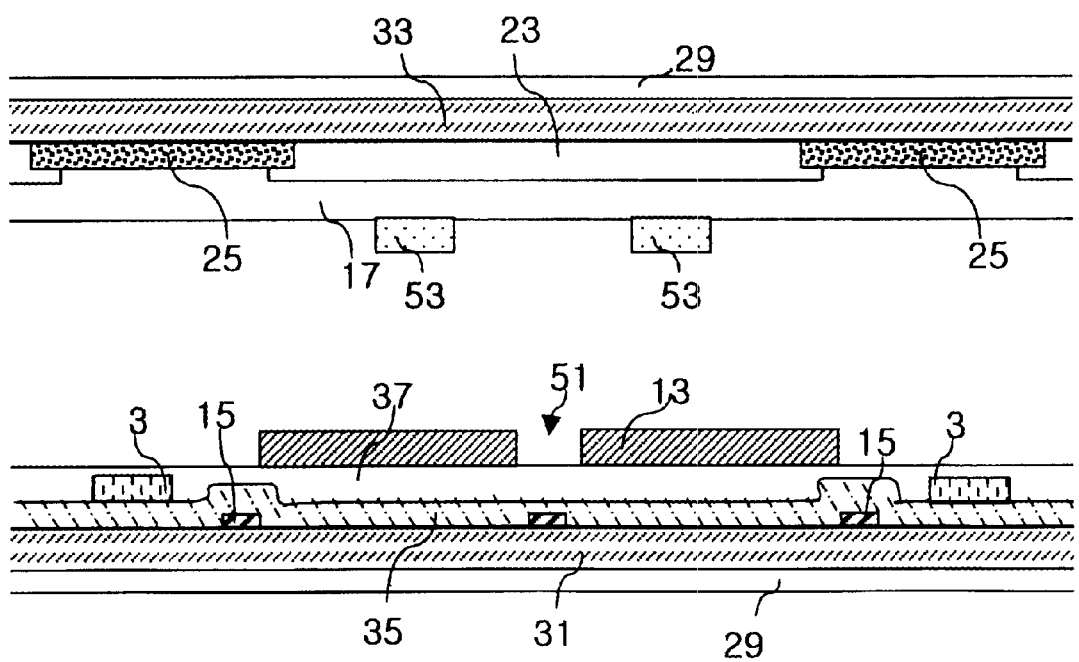
Figure 7C:
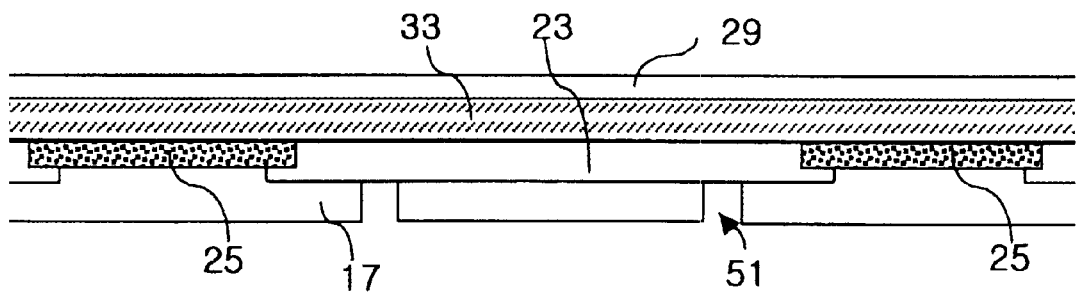
Figure 7C:
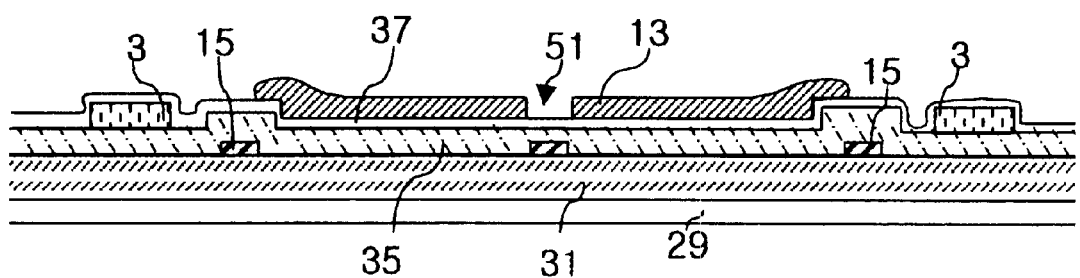
Figure 7D:
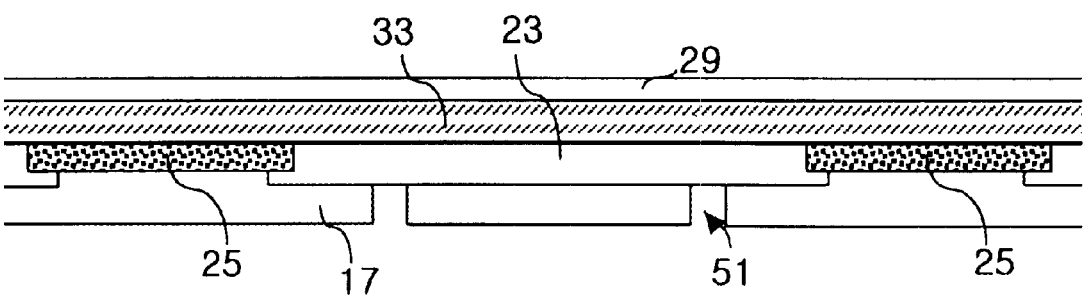
Figure 7D:
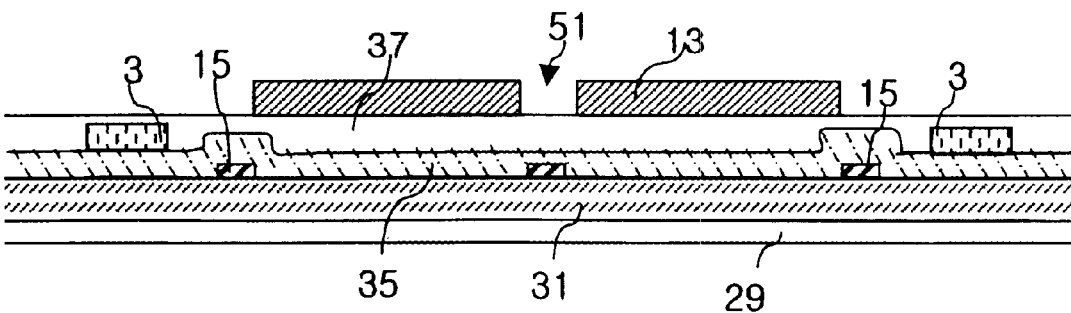
Figure 7E:
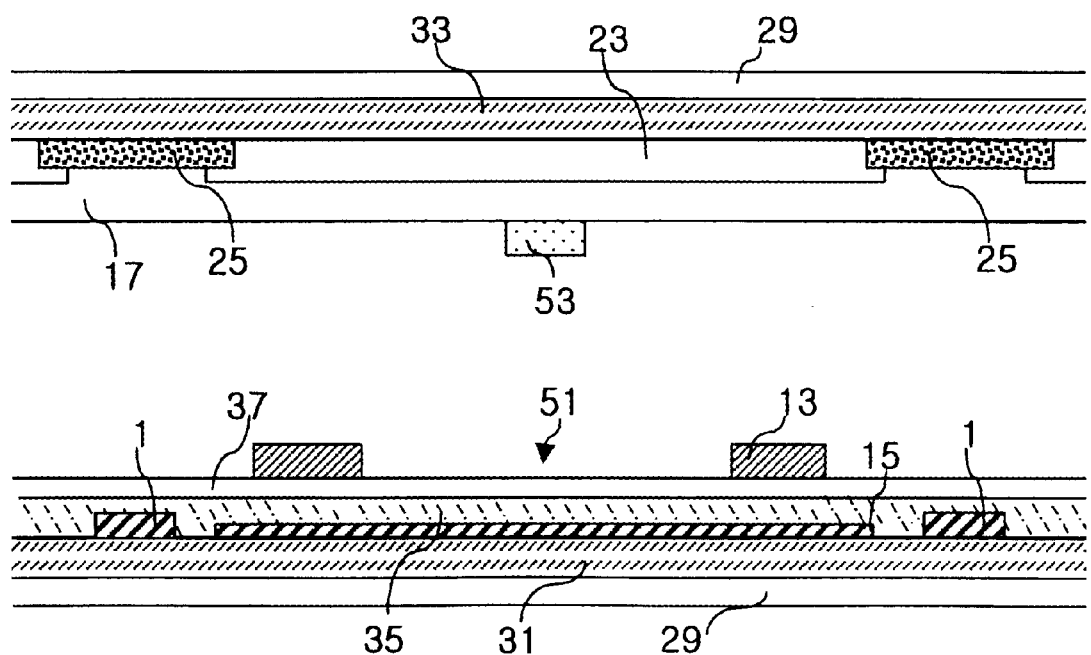

FIGS. 6A, 6B, 6C, 6D, 6E, and 6F are plan views of the multi-domain liquid crystal display devices according to the embodiments of the present invention, FIGS. 7A, 7B, 7C, 7D, and 7E are sectional views taken along the lines III—III and III'–III– of FIG. 6A according to the embodiments of the present invention.

Figure 8A:
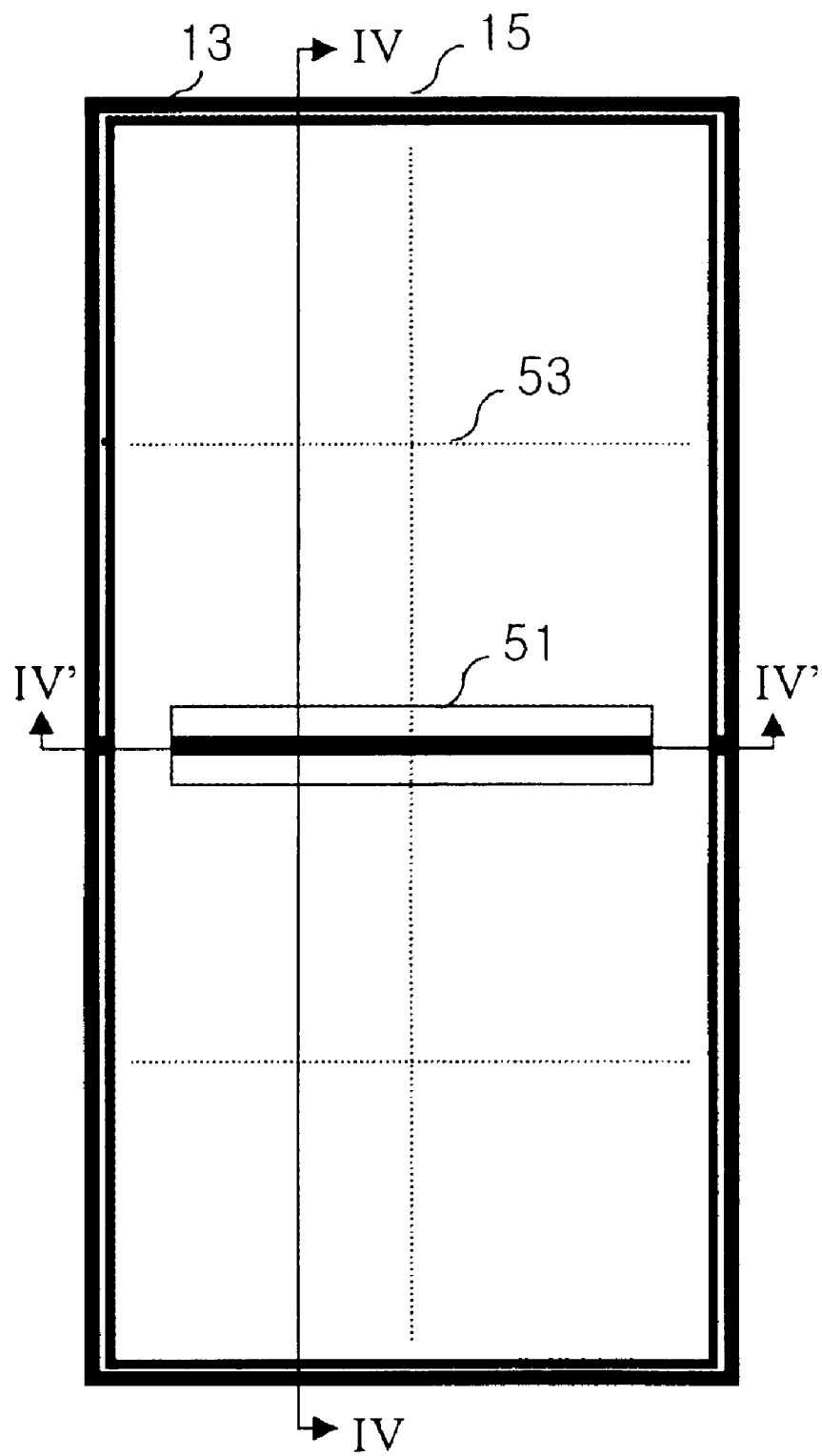
FIGS. 8A, 8B, 8C, 8D, 8E, and 8F are plan views of the multi-domain liquid crystal display devices according to the embodiments of the present invention.
Figure 8B:
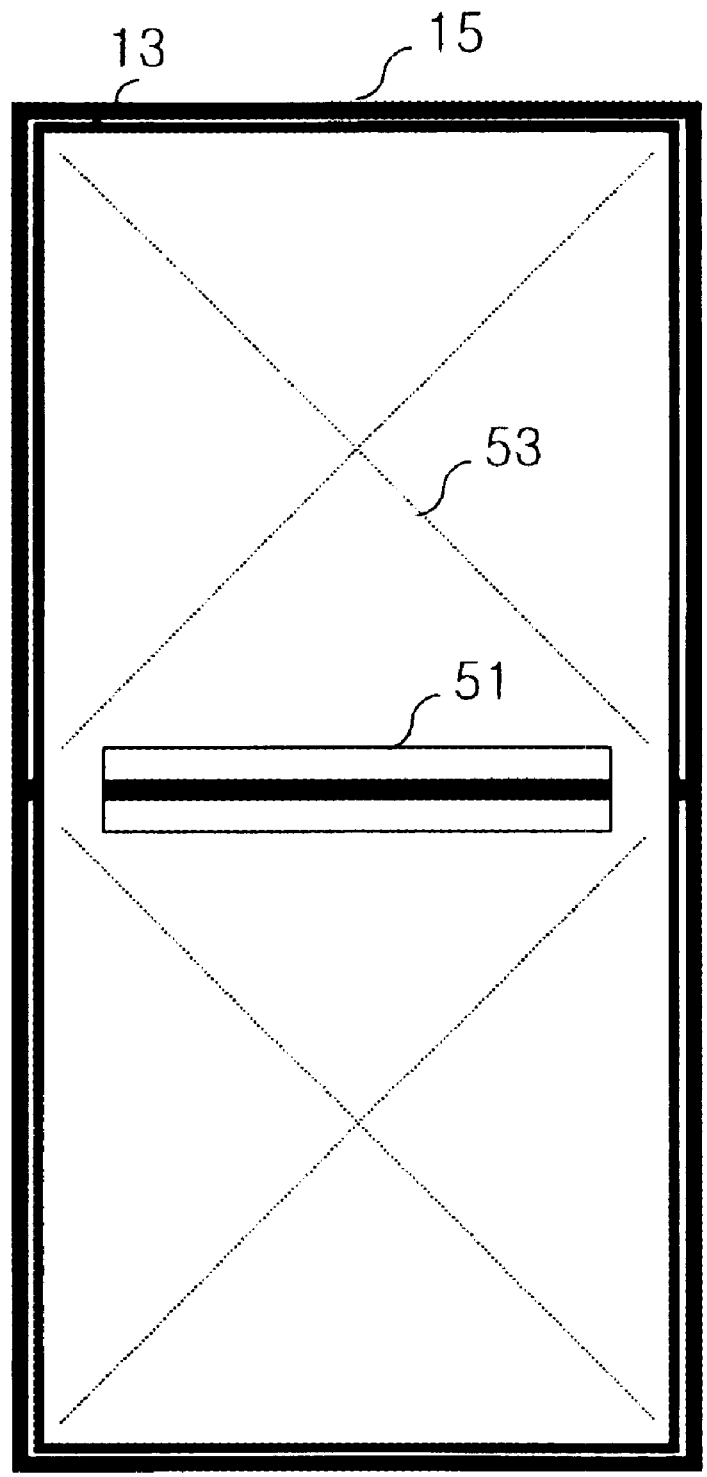
Figure 8C:
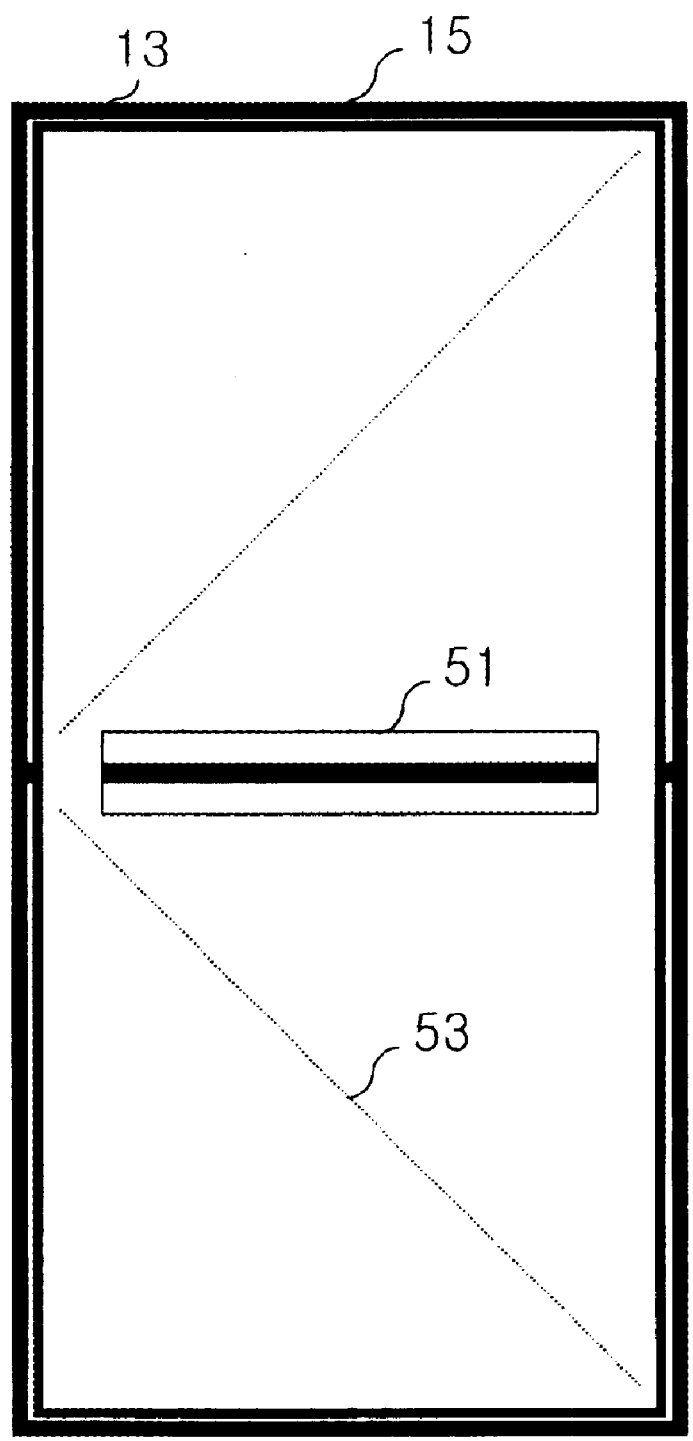
Figure 8D:
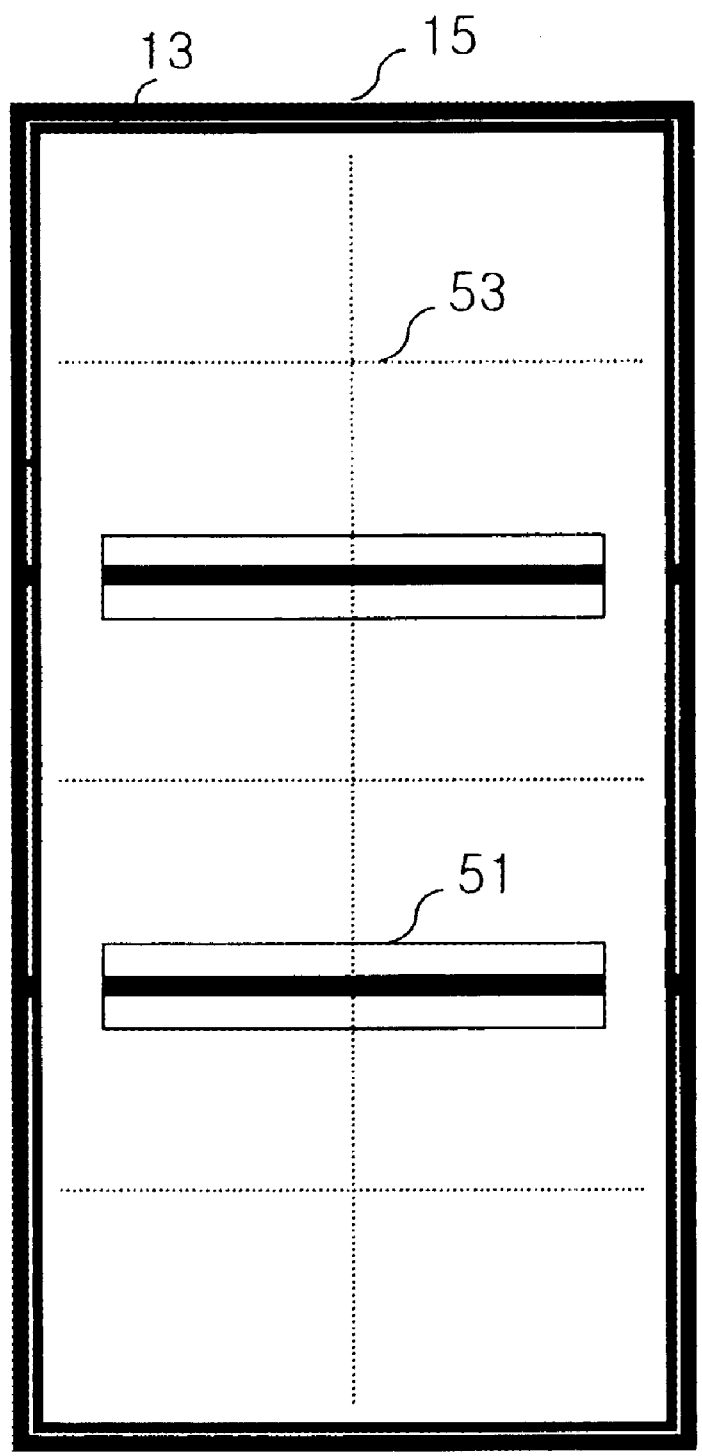
Figure 8E:
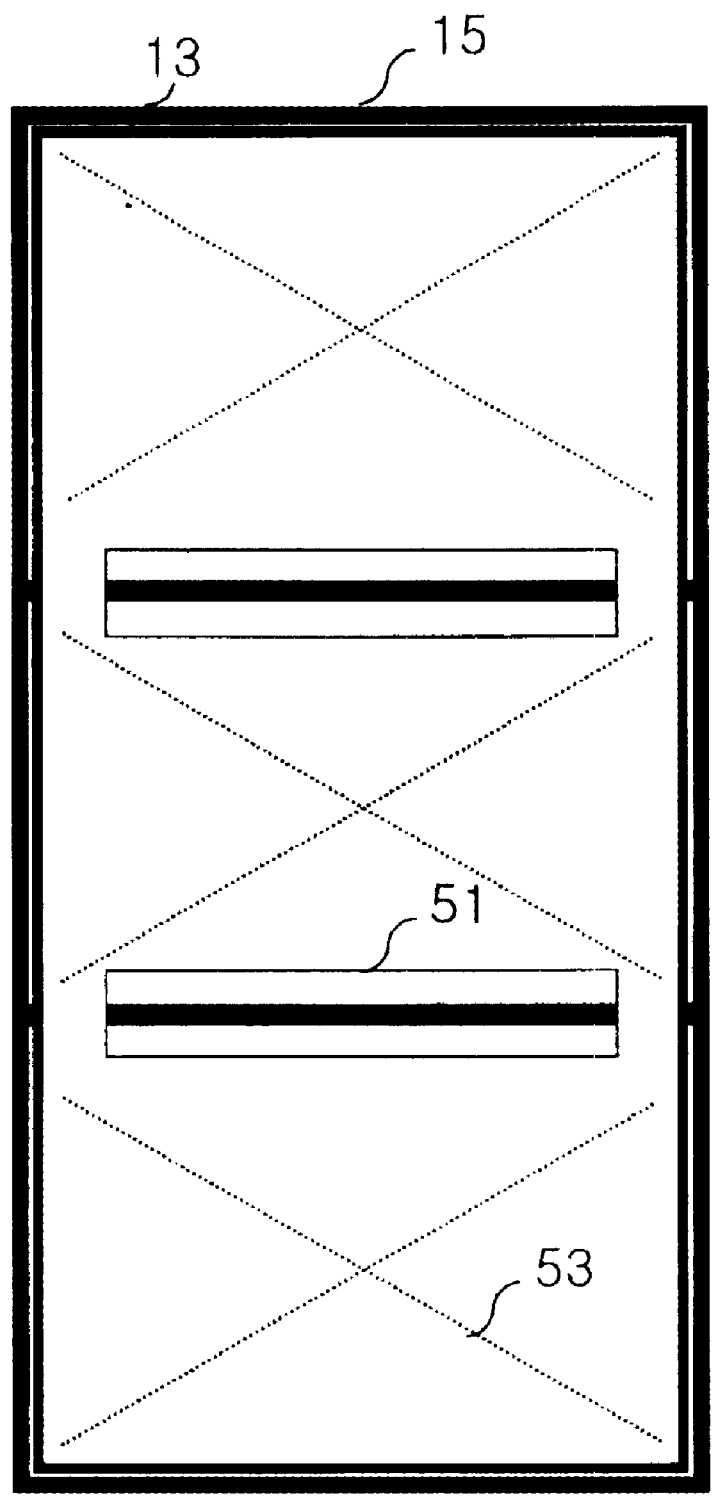
Figure 8F:
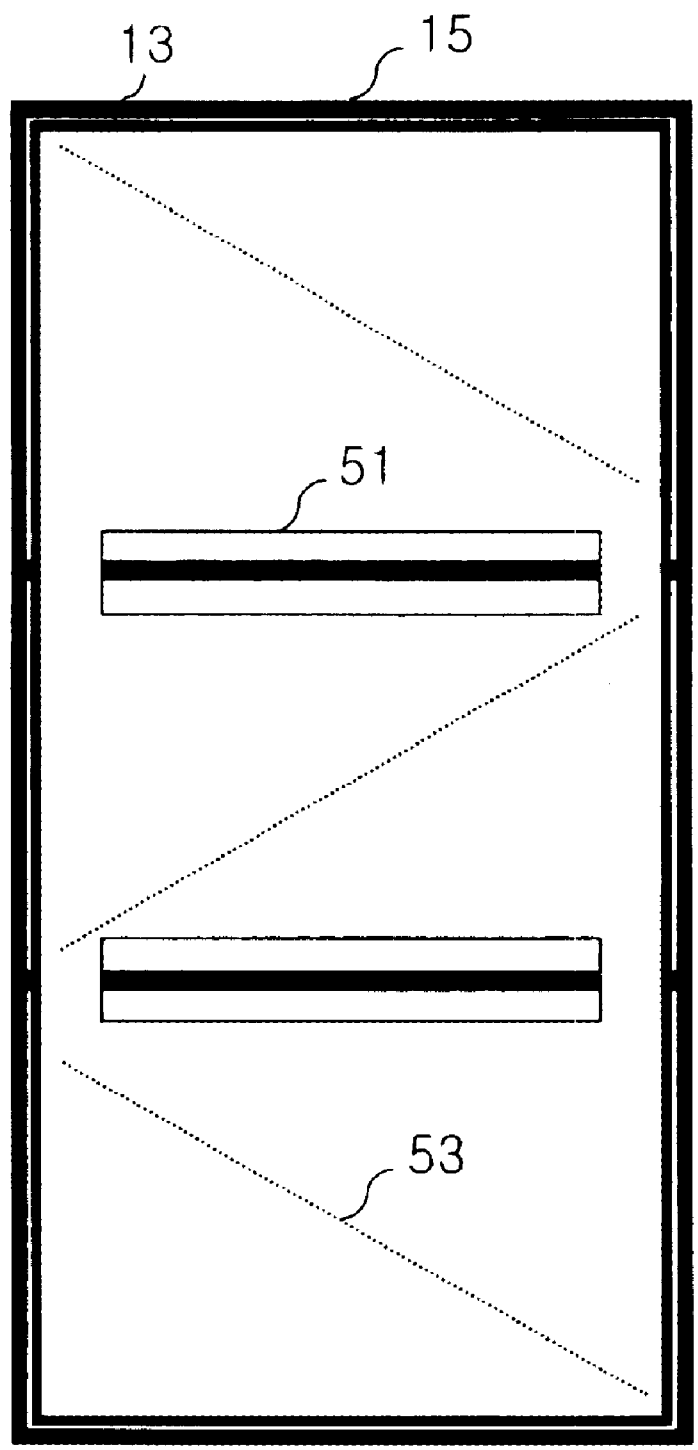
Figure 9A:
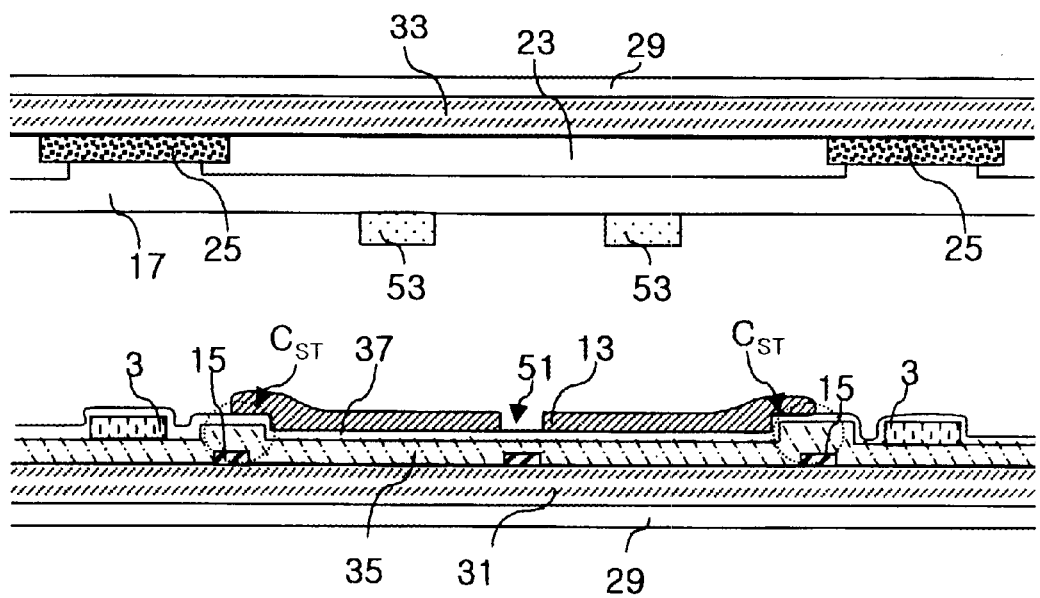
FIGS. 9A, 9B, 9C, 9D, and 9E are sectional views taken along the lines IV—IV and IV'–IV' of FIG. 8A according to the embodiments of the present invention.
Figure 9B:
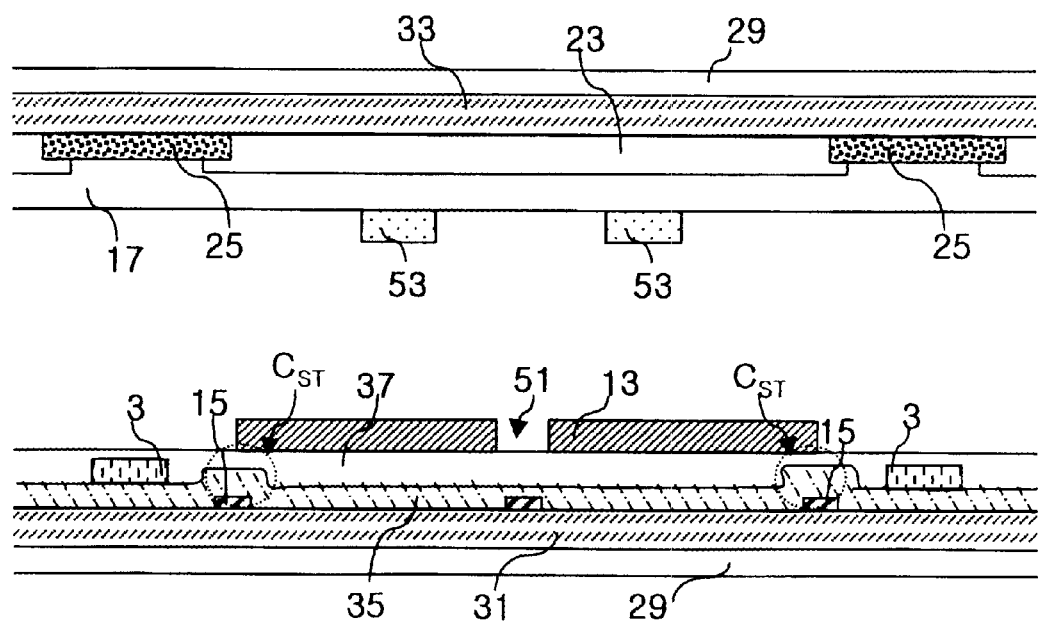
Figure 9C:
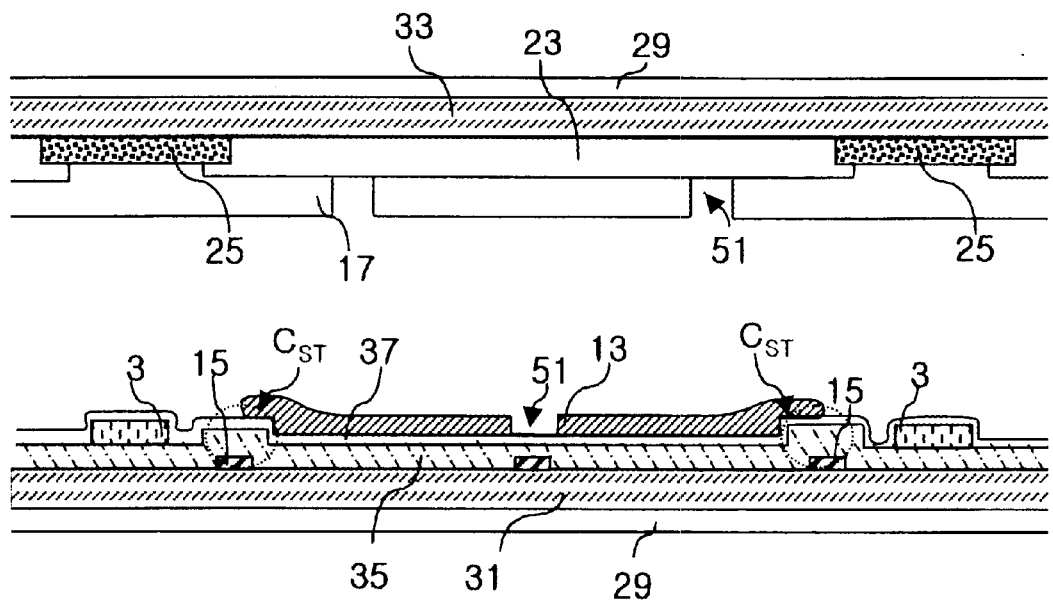
Figure 9D:
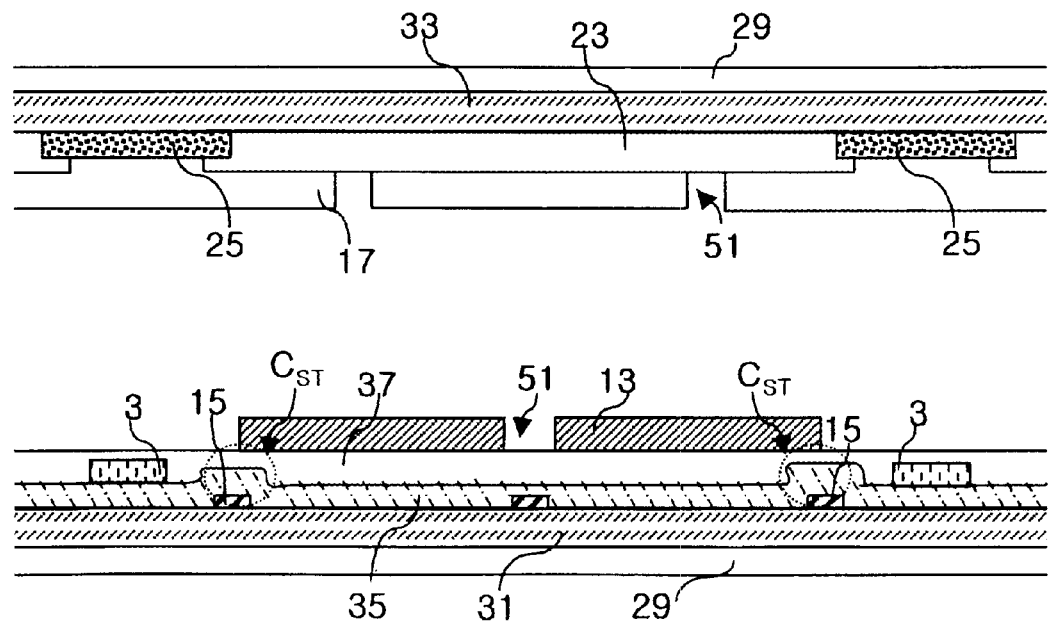
Figure 9E:
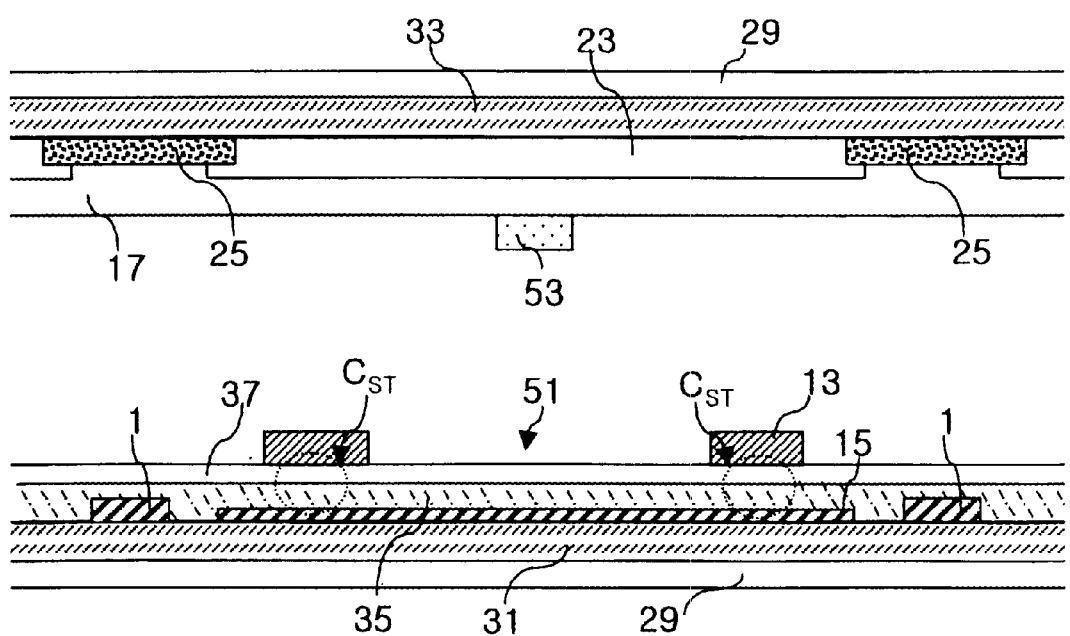

FIGS. 8A, 8B, 8C, 8D, 8E, and 8F are plan views of the multi-domain liquid crystal display devices according to the embodiments of the present invention, FIGS. 9A, 9B, 9C, 9D, and 9E are sectional views taken along the lines IV—IV and IV'–IV' of FIG. 8A according to the embodiments of the present invention.

As shown in the figures, these embodiments have the common-auxiliary electrode 15 also formed in the part where the electric field inducing window 51 is formed.

In the FIGS. 6 and 7, pixel electrode 13 does not overlap common-auxiliary electrode 15, and light shielding layer 25 overlaps the pixel electrode 13 to shield the light leakage of the LCD.

In the multi-domain liquid crystal display device in the FIGS. 8 and 9, pixel electrode 13 overlaps common-auxiliary electrode 15, light shielding layer 25 overlaps the common-auxiliary electrode 15, and then the aperture ratio is improved.

FIGS. 7A, 7C, 9A, 9C show that passivation layer 37 includes $SiN_x$ or $SiO_x$ and FIGS. 7B, 7D, 9B, 9D show that passivation layer 37 includes BCB or acrylic resin in the LCD. Also, FIGS. 7A, 7B, 9A, 9B show that dielectric frame 53 is formed on the common electrode 17, and FIGS. 7C, 7D, 9C, 9D show that electric field inducing window 51 is formed in the common electrode 17.

In the multi-domain LCD of the present invention, the aperture ratio is enhanced by an optimum structure design of a "n-line" thin film transistor (U.S. Pat. No. 5,694,185) so as to reduce power consumption, increase luminance, and lower reflection, thus improving contrast ratio.

Aperture ratio is increased by forming the TFT above the gate line and providing a "n-line" TFT. The parasitic capacitor, occurring between the gate bus line and the drain electrode, can be reduced when a TFT having the same channel length as the symmetrical TFT structure is manufactured due to effect of channel length extension.

The multi-domain LCD of the present invention has a dielectric frame 53 on the pixel electrode, common electrode, and/or color filter layer, or an electric field inducing window 51 like a hole or slit in the pixel electrode, passivation layer, gate insulator, color filter layer, and/or common electrode by patterning, thereby electric field distortion effect and multi-domain are obtained.

That is, from forming electric field inducing window 51 or dielectric frame 53, the multi-domain is obtained by dividing each pixel into four domains such as in a "+", "×", or "double Y" shape, or dividing each pixel horizontally, vertically, and/or diagonally, and differently alignment-treating or forming alignment directions on each domain and on each substrate.

Furthermore, in multi-domain LCD of the present invention, an alignment layer(not shown in the figure) is formed over the whole first and/or second substrates. The alignment layer includes a photosensitive material such as PVCN (polyvinylcinnamate), PSCN (polysiloxanecinnamate), and CelCN (cellulosecinnamate) based materials. Any material suitable for the photo-aligning treatment may be used. Irradiating light once on the alignment layer determines the alignment or pretilt direction and the pretilt angle.

The light used in the photo-alignment is preferably a light in a range of ultraviolet light, and any of unpolarized light, linearly polarized light, and partially polarized light can be used.

In the photo-alignment treatment, it is possible to apply one or both of the first and second substrates, and to apply different aligning-treatment on each substrate.

From the aligning-treatment, a multi-domain LCD is formed with at least two domains, and LC molecules of the LC layer are aligned differently one another on each domain. That is, the multi-domain is obtained by dividing each pixel into four domains such as in a "+" or "×" shape, or dividing each pixel horizontally, vertically, and/or diagonally, and differently alignment-treating or forming alignment directions on each domain and on each substrate.

It is possible to have at least one domain of the divided domains unaligned. It is also possible to have all domains unaligned.

Figure 10A:
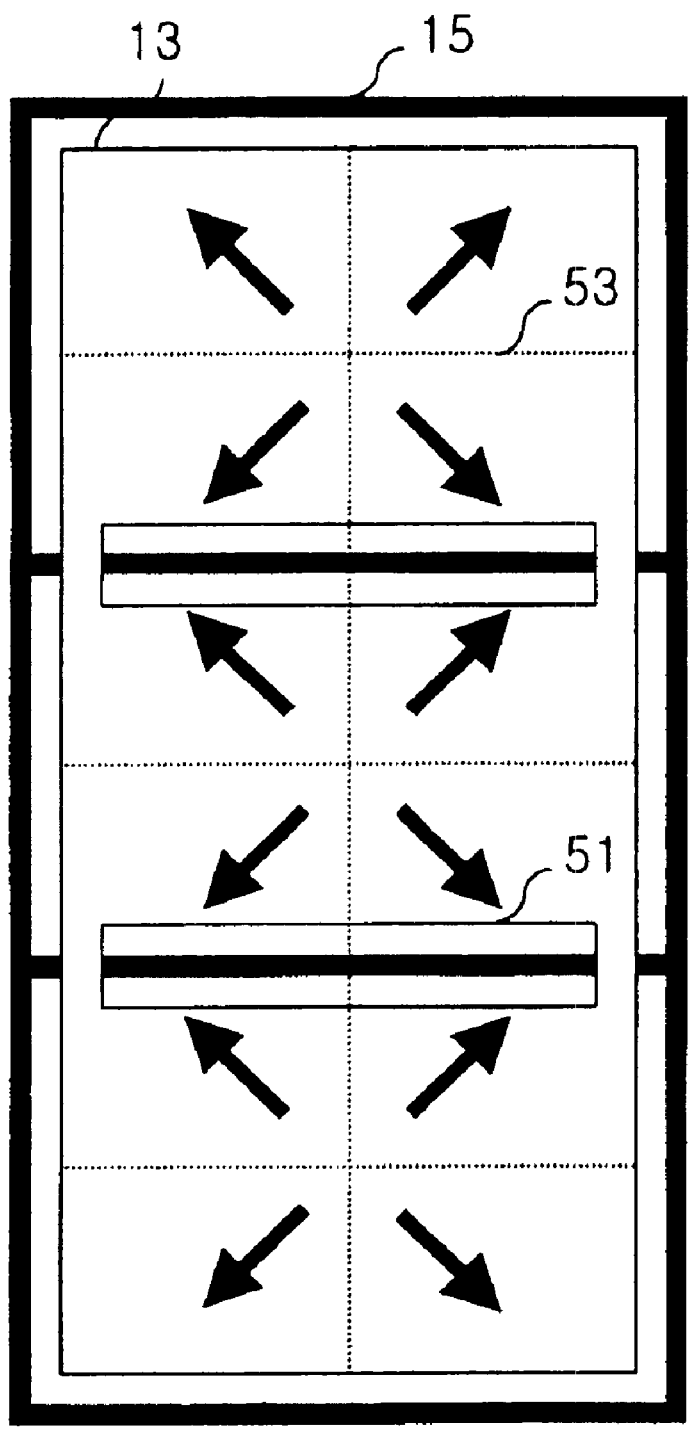
FIGS. 10A and 10B are plan views showing alignment directions of the multi-domain liquid crystal display devices according to the embodiments of the present invention.
Figure 10B:
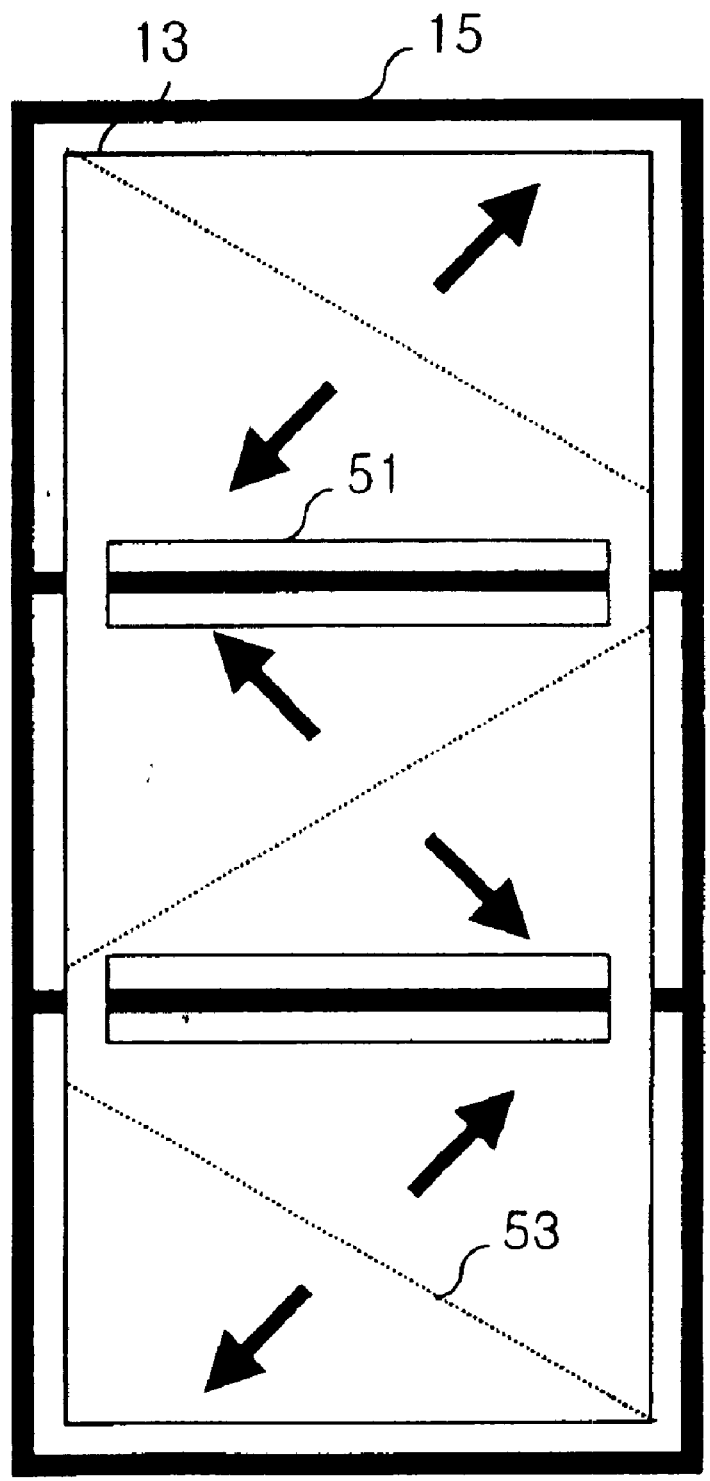
Figure 11A:
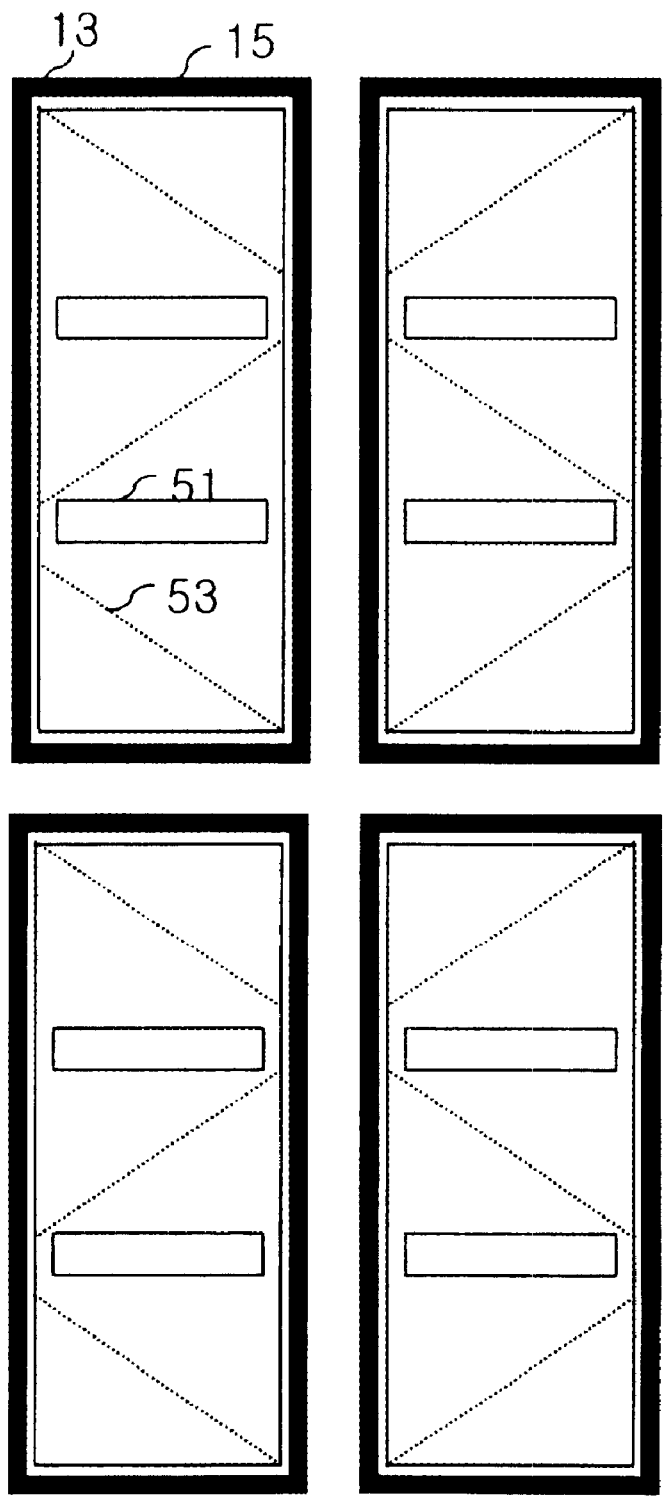
FIGS. 11A and 11B are plan views of the multi-domain liquid crystal display devices according to the embodiments of the present invention.
Figure 11B:
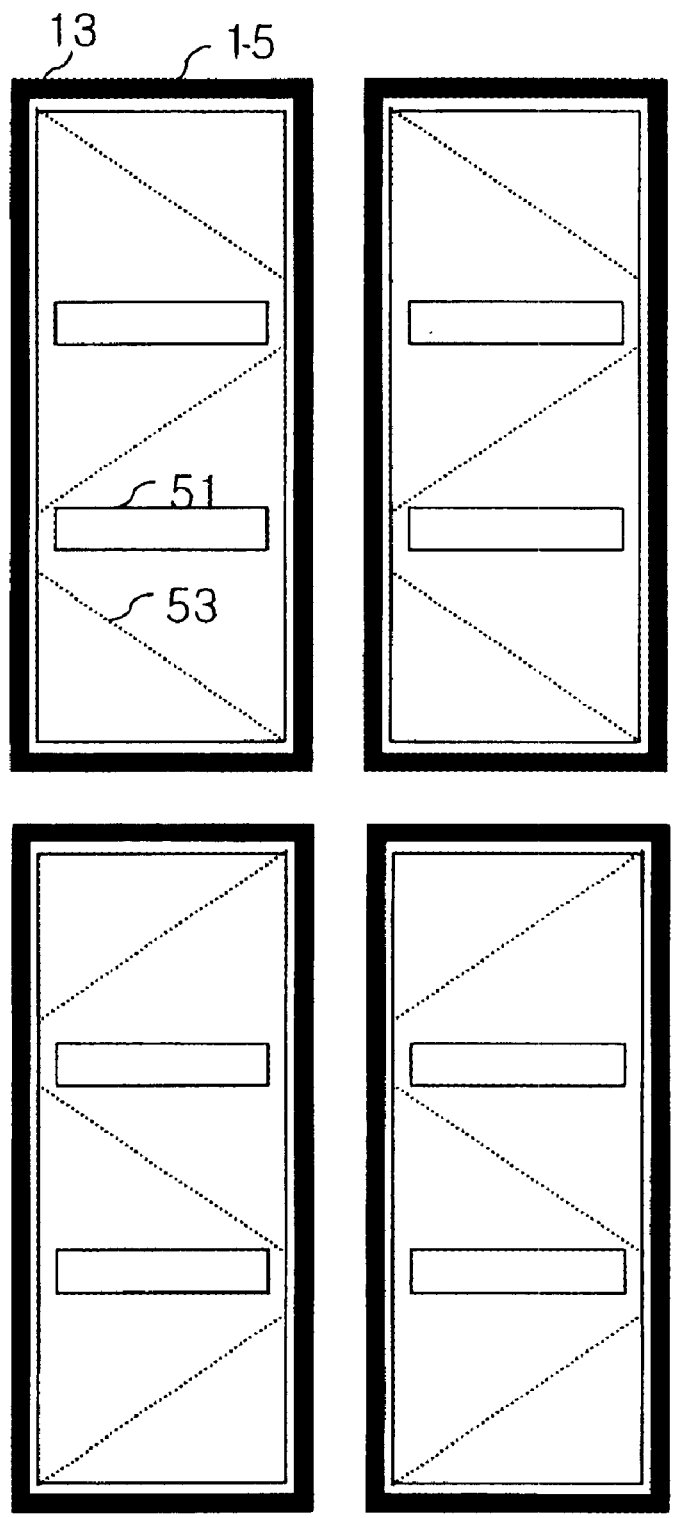
Figure 12A:
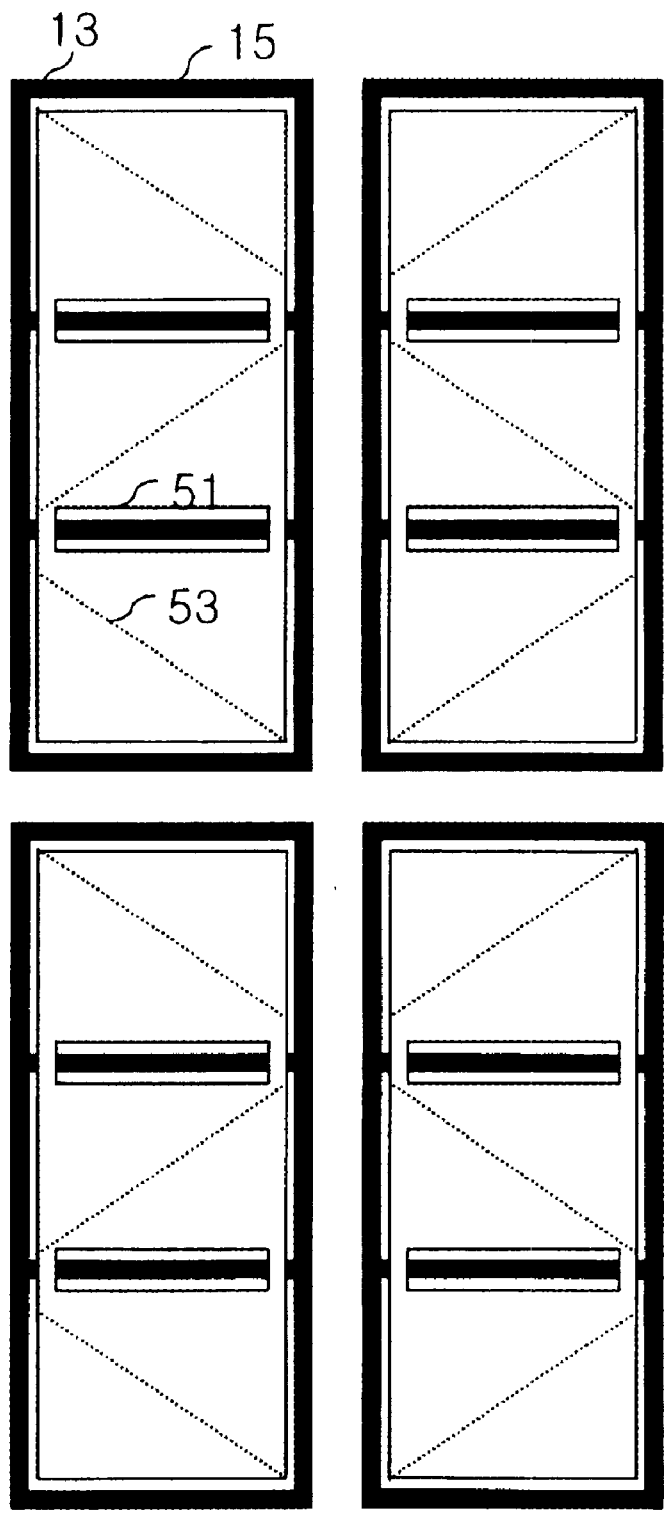
FIGS. 12A and 12B are plan views of the multi-domain liquid crystal display devices according to the embodiments of the present invention.
Figure 12B:
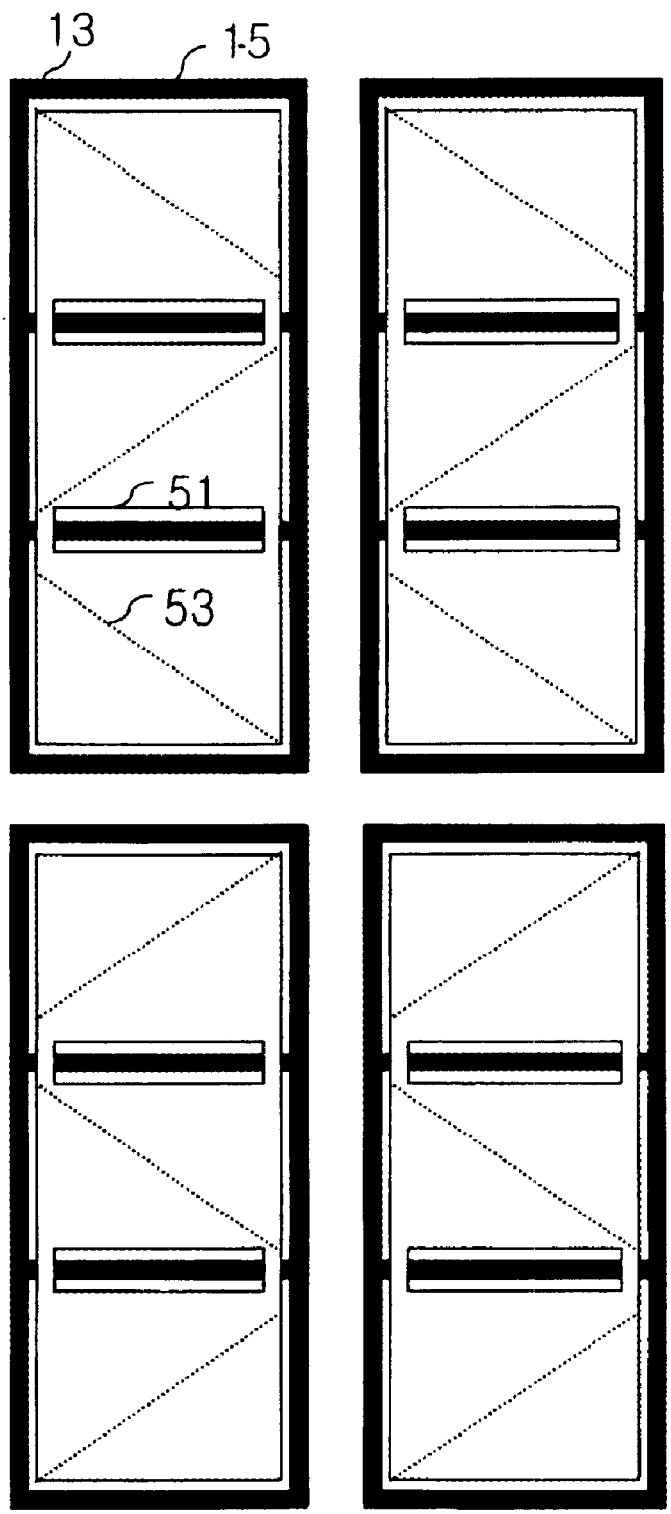

FIGS. 10A and 10B are plan views showing alignment directions of the multi-domain liquid crystal display devices according to the embodiments of the present invention.

FIGS. 11A, 11B, and 12A, 12B are plan views of the multi-domain liquid crystal display devices according to the embodiments of the present invention. In these embodiments, two pixels that respectively have different shapes neighboring left-right or up-down alternate as one unit, which obtains multi-domain effect.

Consequently, since the multi-domain LCD of the present invention forms the gate electrode and the common-auxiliary electrode on the same layer, and electric field inducing windows in the pixel electrode, it is easy to control the alignment directions in domains, which obtains wide viewing angle and multi-domain effect. Moreover, the short between the pixel and common-auxiliary electrodes is removed, and then the yield is improved.

It will be apparent to those skilled in the art that various modifications can be made in the liquid crystal display device of the present invention without departing from the sprit or scope of the invention. Thus, it is intended that the present invention covers the modifications and variations of this invention provided they come within the scope of the appended claims and their equivalents.

What is claimed is:

1. A multi-domain liquid crystal display device comprising:
    first and second substrates facing each other;
    a plurality of gate bus lines arranged in a first direction on said first substrate and a plurality of data bus lines arranged in a second direction on said first substrate to define a pixel region;
    a common-auxiliary electrode surrounding said pixel region on a same layer whereon said gate bus line is formed;
    a gate insulator over said first substrate;
    a passivation layer on said gate insulator over said first substrate;
    a pixel electrode in said pixel region, said pixel electrode having an electric field inducing window in the inner part thereof;
    a light shielding layer on said second substrate;
    a color filter layer on said light shielding layer;
    a common electrode on said color filter layer;
    an alignment layer on at least one substrate between said first and second substrate; and
    a liquid crystal layer between said first and second substrates;
    wherein said pixel electrode is not overlapping said common-auxiliary electrode.

2. The multi-domain liquid crystal display device according to claim 1, further comprising:
    a storage electrode connecting said pixel electrode and overlapping said gate bus line.

3. The multi-domain liquid crystal display device according to claim 1, wherein said light shielding layer overlaps said common-auxiliary electrode.

4. The multi-domain liquid crystal display device according to claim 1, wherein said gate insulator and passivation layer are formed in an area that does not overlap said common-auxiliary electrode.

5. The multi-domain liquid crystal display device according to claim 1, wherein said common-auxiliary electrode is electrically connected to said common electrode.

6. The multi-domain liquid crystal display device according to claim 1, further comprising;
    a dielectric frame for distorting electric field on said pixel electrode.

7. The multi-domain liquid crystal display device according to claim 1, further comprising;
    a dielectric frame for distorting electric field on said common electrode.

8. The multi-domain liquid crystal display device according to claim 7, wherein dielectric constant of said dielectric frame is equal to or lower than dielectric constant of said liquid crystal layer.

9. The multi-domain liquid crystal display device according to claim 7, wherein said dielectric frame includes photosensitive materials.

10. The multi-domain liquid crystal display device according to claim 7, wherein said dielectric frame includes a material selected from the group consisting of photoacrylate and BCB (BenzoCycloButene).

11. The multi-domain liquid crystal display device according to claim 6, wherein dielectric constant of said dielectric frame is equal to or lower than dielectric constant of said liquid crystal layer.

12. The multi-domain liquid crystal display device according to claim 6, wherein said dielectric frame includes photosensitive materials.

13. The multi-domain liquid crystal display device according to claim 6, wherein said dielectric frame includes a material selected from the group consisting of photoacrylate and BCB (BenzoCycloButene).

14. The multi-domain liquid crystal display device according to claim 1, further comprising:
    a thin film transistor at a crossing area of said gate and data bus lines.

15. A multi-domain liquid crystal display device, comprising:
    first and second substrates facing each other;
    a plurality of gate bus lines arranged in a first direction on said first substrate and a plurality of data bus lines arranged in a second direction on said first substrate to define a pixel region;
    a common-auxiliary electrode surrounding said pixel region on a same layer whereon said gate bus line is formed;
    a gate insulator over said first substrate;
    a passivation layer on said gate insulator over said first substrate;
    a pixel electrode in said pixel region, said pixel electrode having an electric field inducing window in the inner part thereof;
    a light shielding layer on said second substrate;
    a color filter layer on said light shielding layer;
    a common electrode on said color filter layer;
    an alignment layer on at least one substrate between said first and second substrate; and
    a liquid crystal layer between said first and second substrates, wherein said passivation layer has an electric field inducing window in the inner part thereof.

16. A multi-domain liquid crystal display device, comprising:
    first and second substrates facing each other;
    a plurality of gate bus lines arranged in a first direction on said first substrate and a plurality of data bus lines arranged in a second direction on said first substrate to define a pixel region;
    a common-auxiliary electrode surrounding said pixel region on a same layer whereon said gate bus line is formed;
    a gate insulator over said first substrate;
    a passivation layer on said gate insulator over said first substrate;
    a pixel electrode in said pixel region, said pixel electrode having an electric field inducing window in the inner part thereof;

a light shielding layer on said second substrate;

a color filter layer on said light shielding layer;

a common electrode on said color filter layer;

an alignment layer on at least one substrate between said first and second substrate; and a liquid crystal layer between said first and second substrates, wherein said gate insulator has an electric field inducing window in the inner part thereof.

17. A multi-domain liquid crystal display device, comprising:

first and second substrates facing each other;

a plurality of gate bus lines arranged in a first direction on said first substrate and a plurality of data bus lines arranged in a second direction on said first substrate to define a pixel region;

a common-auxiliary electrode surrounding said pixel region on a same layer whereon said gate bus line is formed;

a gate insulator over said first substrate;

a passivation layer on said gate insulator over said first substrate;

a pixel electrode in said pixel region, said pixel electrode having an electric field inducing window in the inner part thereof;

a light shielding layer on said second substrate;

a color filter layer on said light shielding layer;

a common electrode on said color filter layer;

an alignment layer on at least one substrate between said first and second substrate; and a liquid crystal layer between said first and second substrates, wherein said color filter layer has an electric field inducing window in the inner part thereof.

18. A multi-domain liquid crystal display device, comprising:

first and second substrates facing each other;

a plurality of gate bus lines arranged in a first direction on said first substrate and a plurality of data bus lines arranged in a second direction on said first substrate to define a pixel region;

a common-auxiliary electrode surrounding said pixel region on a same layer whereon said gate bus line is formed;

a gate insulator over said first substrate;

a passivation layer on said gate insulator over said first substrate;

a pixel electrode in said pixel region, said pixel electrode having an electric field inducing window in the inner part thereof;

a light shielding layer on said second substrate;

a color filter layer on said light shielding layer;

a common electrode on said color filter layer;

an alignment layer on at least one substrate between said first and second substrate;

a liquid crystal layer between said first and second substrates; and an overcoat layer, wherein said over coat layer has an electric field inducing window in the inner part thereof.

19. The multi-domain liquid crystal display device according to claim 1, wherein said common electrode has an electric field inducing window in the inner part thereof.

20. The multi-domain liquid crystal display device according to claim 1, further comprising;

an over coat layer on said color filter layer.

21. The multi-domain liquid crystal display device according to claim 1, wherein said passivation layer includes a material selected from the group consisting of BCB (BenzoCycloButene), acrylic resin, and polyimide compound.

22. The multi-domain liquid crystal display device according to claim 1, wherein said passivation layer includes a material selected from the group consisting of silicon nitride and silicon oxide.

23. The multi-domain liquid crystal display device according to claim 1, wherein said common-auxiliary electrode includes a material selected from the group consisting of ITO (indium tin oxide), aluminum, molybdenum, chromium, tantalum, titanium, and an alloy thereof.

24. The multi-domain liquid crystal display device according to claim 1, wherein said pixel electrode includes a material selected from the group consisting of ITO (indium tin oxide), aluminum, and chromium.

25. The multi-domain liquid crystal display device according to claim 1, wherein said common electrode includes ITO (indium tin oxide).

26. A multi-domain liquid crystal display device comprising:

first and second substrates facing each other;

a plurality of gate bus lines arranged in a first direction on said first substrate and a plurality of data bus lines arranged in a second direction on said first substrate to define a pixel region;

a common-auxiliary electrode surrounding said pixel region on a same layer whereon said gate bus line is formed;

a gate insulator over said first substrate;

a passivation layer on said gate insulator over said first substrate;

a pixel electrode in said pixel region on a layer above the common-auxiliary electrode, said pixel electrode having an electric field inducing window in the inner part thereof and being not overlapping said common-auxiliary electrode;

a light shielding layer on said second substrate;

a color filter layer on said light shielding layer;

a common electrode on said color filter layer;

an alignment layer on at least one substrate between said first and second substrates; and a liquid crystal layer between said first and second substrates.

27. The multi-domain liquid crystal display device according to claim 1, wherein said pixel region is divided into at least two portions, liquid crystal molecules in paid liquid crystal layer in each portion being driven differently from each other.

28. The multi-domain liquid crystal display device according to claim 1, wherein said alignment layer is divided into at least two portions, liquid crystal molecules in said liquid crystal layer in each portion being aligned differently from each other.

29. The multi-domain liquid crystal display device according to claim 28, wherein at least one portion of said at least two portions of the alignment layer is alignment-treated.

30. The multi-domain liquid crystal display device according to claim 28, wherein all portions of said at least two portions of the alignment layer are non-alignment-treated.

31. The multi-domain liquid crystal display device according to claim 1, wherein said liquid crystal layer includes liquid crystal molecules having positive dielectric anisotropy.

32. The multi-domain liquid crystal display device according to claim 1, wherein said liquid crystal layer includes liquid, crystal molecules having negative dielectric anisotropy.

33. The multi-domain liquid crystal display device according to claim 1, further comprising:
   a negative uniaxial film on at least one substrate.

34. The multi-domain liquid crystal display device according to claim 1, further comprising:
   a negative biaxial film on at least one substrate.

35. The multi-domain liquid crystal display device according to claim 1, wherein said liquid crystal layer includes chiral dopants.

36. A multi-domain liquid crystal display device comprising:
   a data bus line which data signal is applied to;
   a gate bus line crossed with said data bus line to define a pixel region;
   a pixel electrode in said pixel region, said pixel electrode having an electric field inducing window in the inner part thereof; and
   a common-auxiliary electrode surrounding said pixel region on a same layer whereon said gate bus line is formed, wherein said pixel electrode does not overlap said common auxiliary electrode.

37. The multi-domain liquid crystal display device according to claim 36, further comprising;
   a dielectric frame for distorting electric field on said pixel electrode.

38. A multi-domain liquid crystal display device comprising:
   first and second substrates facing each other;
   a plurality of gate bus lines arranged in a first direction on said first substrate and a plurality of data bus lines arranged in a second direction on said first substrate to defined a pixel region;
   a common-auxiliary electrode surrounding said pixel region on a same layer whereon said gate bus line is formed;
   a gate insulator over said first substrate;
   a passivation layer on said gate insulator over said first substrate, said passivation layer having an electric field inducing window in the inner part thereof;
   a pixel electrode in said pixel region on a layer above the common-auxiliary electrode, said pixel electrode having an electric field inducing window in the inner part thereof;
   a light shielding layer on said second substrate;
   a color filter layer on said light shielding layer;
   a common electrode on said color filter layer;
   an alignment layer on at least one substrate between said first and second substrates; and
   a liquid crystal layer between said first and second substrates.

39. A multi-domain liquid crystal display device comprising:
   first and second substrates facing each other;
   a plurality of gate bus lines arranged in a first direction on said first substrate and a plurality of data bus lines arranged in a second direction on said first substrate to define a pixel region;
   a common-auxiliary electrode surrounding said pixel region on a same layer whereon said gate bus line is formed;
   a gate insulator over said first substrate, said gate insulator having an electric field inducing window in the inner part thereof;
   a passivation layer on said gate insulator over said first substrate;
   a pixel electrode in said pixel region on a layer above the common-auxiliary electrode, said pixel electrode having an electric field inducing window in the inner part thereof;
   a light shielding layer on said second substrate;
   a color filter layer on said light shielding layer;
   a common electrode on said color filter layer;
   an alignment layer on at least one substrate between said first and second substrates; and
   a liquid crystal layer between said first and second substrates.

40. A multi-domain liquid crystal display device comprising:
   first and second substrates facing each other;
   a plurality of gate bus lines arranged in a first direction on said first substrate and a plurality of data bus lines arranged in a second direction on said first substrate to define a pixel region;
   a common-auxiliary electrode surrounding said pixel region on a same layer whereon said gate bus line is formed;
   a gate insulator over said first substrate;
   a passivation layer on said gate insulator over said first substrate;
   a pixel electrode in said pixel region on a layer above the common-auxiliary electrode, said pixel electrode having an electric field inducing window in the inner part thereof;
   a light shielding layer on said second substrate;
   a color filter layer on said light shielding layer, said color filter layer having an electric field inducing window in the inner part thereof;
   a common electrode on said color filter layer;
   an alignment layer on at least one substrate between said first and second substrates; and
   a liquid crystal layer between said first and second substrates.

41. A multi-domain liquid crystal display device comprising:
   first and second substrates facing each other;
   a plurality of gate bus lines arranged in a first direction on said first substrate and a plurality of data bus lines arranged in a second direction on said first substrate to define a pixel region;
   a common-auxiliary electrode surrounding said pixel region on a same layer whereon said gate bus line is formed;
   a gate insulator over said first substrate;
   a passivation layer on said gate insulator over said first substrate;
   a pixel electrode in said pixel region on a layer above the common-auxiliary electrode, said pixel electrode having an electric field inducing window in the inner part thereof;

a light shielding layer on said second substrate;

a color filter layer on said light shielding layer;

an overcoat layer on said color filter layer, said overcoat layer having an electric field inducing window in the inner part thereof;

a common electrode on said color filter layer;

an alignment layer on at least one substrate between said first and second substrates; and a liquid crystal layer between said first and second substrates.

* * * * *